US010877978B1

(12) United States Patent
Horling et al.

(10) Patent No.: US 10,877,978 B1
(45) Date of Patent: *Dec. 29, 2020

(54) RANKING COMMUNITIES BASED ON MEMBERS

(71) Applicant: Google Inc., Mountain View, CA (US)

(72) Inventors: Bryan Christopher Horling, Sunnyvale, CA (US); Okan Kolak, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 434 days.

This patent is subject to a terminal disclaimer.

(21) Appl. No.: 15/838,313

(22) Filed: Dec. 11, 2017

Related U.S. Application Data

(63) Continuation of application No. 14/017,946, filed on Sep. 4, 2013, now Pat. No. 9,858,317.

(51) Int. Cl.
G06F 16/00 (2019.01)
G06F 16/2457 (2019.01)
G06F 16/28 (2019.01)
G06Q 50/10 (2012.01)
G06Q 50/00 (2012.01)
G06F 16/958 (2019.01)

(52) U.S. Cl.
CPC ...... G06F 16/24578 (2019.01); G06F 16/285 (2019.01); G06F 16/958 (2019.01); G06Q 50/01 (2013.01); G06Q 50/10 (2013.01)

(58) Field of Classification Search
CPC ............. G06F 16/24578; G06F 16/285; G06F 16/958; G06Q 10/10; G06Q 50/10; G06Q 50/01
See application file for complete search history.

(56) References Cited

U.S. PATENT DOCUMENTS 6,285,999 B1 9/2001 Page
6,643,681 B1 11/2003 Saito et al.
(Continued)

OTHER PUBLICATIONS

USPTO, Office Action for U.S. Appl. No. 14/017,946, dated May 20, 2015.
(Continued)

Primary Examiner — Diedra McQuitery
(74) Attorney, Agent, or Firm — Lowenstein Sandler LLP

(57) ABSTRACT

Implementations describe ranking communities based on members. A method includes receiving input of data entered into a search field, predicting a search term based on the data, determining communities associated with a social network that satisfy a content match rule directed to a match between the predicted search term and information identifying the communities, the determined communities having scores that are based on results of the content match rule as applied to the communities, determining levels of reputations of the members of the determined communities that satisfy the content match rule, modifying the scores for the determined communities based on the determined levels of the reputations of the members, ranking the determined communities based on the modified scores, and providing identification of the predicted search term and the determined communities, where the determined communities are presented in a ranked order in accordance with the ranking.

23 Claims, 13 Drawing Sheets

Related U.S. Application Data

(60) Provisional application No. 61/732,920, filed on Dec. 3, 2012.

(56) References Cited

U.S. PATENT DOCUMENTS

| | | | |
|---|---|---|---|
| 6,799,176 | B1 | 9/2004 | Page |
| 7,373,606 | B2 | 5/2008 | Gorzela |
| 7,433,876 | B2 | 10/2008 | Spivack et al. |
| 7,499,965 | B1 | 3/2009 | Chai |
| 7,895,284 | B2 | 2/2011 | Kim |
| 8,010,460 | B2 | 8/2011 | Work et al. |
| 8,086,605 | B2 | 12/2011 | Xu et al. |
| 8,108,414 | B2 | 1/2012 | Stackpole |
| 8,244,599 | B2 | 8/2012 | Sundaresan |
| 8,316,018 | B2 | 11/2012 | Solaro et al. |
| 8,321,355 | B2 | 11/2012 | Pulito et al. |
| 8,359,276 | B2 | 1/2013 | Zhuang et al. |
| 8,370,486 | B2 | 2/2013 | Kim |
| 8,527,447 | B2 | 9/2013 | Dube et al. |
| 8,572,094 | B2 | 10/2013 | Luo et al. |
| 8,650,133 | B2 | 2/2014 | Pulito et al. |
| 8,688,691 | B2 | 4/2014 | Ahmed et al. |
| 8,738,613 | B2 | 5/2014 | Ahmed et al. |
| 9,081,823 | B2 | 7/2015 | Luo et al. |
| 9,195,996 | B1 * | 11/2015 | Walsh ............... G06Q 30/0282 |
| 9,740,785 | B1 * | 8/2017 | Robinson ............ G06F 16/9535 |
| 2002/0062368 | A1 * | 5/2002 | Holtzman ............... G06F 21/31 709/224 |
| 2006/0042483 | A1 * | 3/2006 | Work ............... G06F 16/24578 101/91 |
| 2006/0271859 | A1 | 11/2006 | Gorzela |
| 2007/0288602 | A1 | 12/2007 | Sundaresan |
| 2008/0005064 | A1 | 1/2008 | Sarukkai |
| 2008/0065600 | A1 * | 3/2008 | Batteram ............... G06F 16/335 |
| 2008/0071929 | A1 | 3/2008 | Motte et al. |
| 2008/0117861 | A1 | 5/2008 | Balandina et al. |
| 2008/0120411 | A1 | 5/2008 | Eberle |
| 2009/0132689 | A1 | 5/2009 | Zaltzman et al. |
| 2009/0157667 | A1 | 6/2009 | Brougher et al. |
| 2009/0192895 | A1 | 7/2009 | Gerichter et al. |
| 2009/0228294 | A1 | 9/2009 | Choi et al. |
| 2009/0240516 | A1 | 9/2009 | Palestrant |
| 2009/0271247 | A1 | 10/2009 | Karelin et al. |
| 2010/0205541 | A1 * | 8/2010 | Rapaport ............... G06Q 10/10 715/753 |
| 2011/0010384 | A1 | 1/2011 | Luo et al. |
| 2011/0022602 | A1 * | 1/2011 | Luo ................... G06F 16/24578 707/748 |
| 2011/0022621 | A1 | 1/2011 | Luo et al. |
| 2011/0208749 | A1 | 8/2011 | Guo et al. |
| 2011/0213785 | A1 | 9/2011 | Kristiansson et al. |
| 2011/0302102 | A1 | 12/2011 | Yeleshwarapu et al. |
| 2012/0166536 | A1 | 6/2012 | Song et al. |
| 2012/0297038 | A1 | 11/2012 | Mei et al. |
| 2012/0317200 | A1 | 12/2012 | Chan |
| 2013/0054698 | A1 * | 2/2013 | Lee .................... G06Q 30/0267 709/204 |
| 2013/0073400 | A1 | 3/2013 | Heath |
| 2013/0198191 | A1 | 8/2013 | Lara Hemandez et al. |
| 2013/0254397 | A1 | 9/2013 | Lai et al. |
| 2014/0317126 | A1 | 10/2014 | Work et al. |
| 2015/0089409 | A1 * | 3/2015 | Asseily .................. G06Q 50/01 715/765 |

OTHER PUBLICATIONS

USPTO, Final Office Action for U.S. Appl. No. 14/017,946, dated Dec. 1, 2015.

USPTO, Office Action for U.S. Appl. No. 14/017,946, dated Mar. 10, 2016.

USPTO, Final Office Action for U.S. Appl. No. 14/017,946, dated Sep. 15, 2016.

USPTO, Office Action for U.S. Appl. No. 14/017,946, dated Mar. 8, 2017.

USPTO, Notice of Allowance for U.S. Appl. No. 14/017,946, dated Aug. 18, 2017.

* cited by examiner

_US 10,877,978 B1_

RANKING COMMUNITIES BASED ON MEMBERS

CROSS-REFERENCE TO RELATED APPLICATIONS

This application is a continuation of U.S. Non-Provisional patent application Ser. No. 14/017,946, filed Sep. 4, 2013, entitled "Ranking Communities Based on Members", and claims the benefit of and priority, under 35 U.S.C. § 119 (e), to U.S. Provisional Patent Application No. 61/732,920, filed on Dec. 3, 2012, and titled "Ranking Communities Based on Members", which are hereby incorporated by reference in their entirety.

BACKGROUND

The Internet has created a web of computers and with that, has also created a web of information. People access the Internet to find information that they desire. For example, some people access the Internet to research an issue. Some other people access the Internet for socializing with other people.

People search the Internet for finding information regarding an object or person. To access more information regarding the object or person, people access a web browser. When people access the web browser, they can be lost in a large pool of information and may be unable to access desirable information regarding the object or person.

SUMMARY

The present disclosure relates to ranking communities based on members of the communities. It should be appreciated that the implementations described in the present disclosure may be implemented in numerous ways, e.g., a process, an apparatus, a system, a device or a method on a computer-readable medium.

Various implementations described in the present disclosure provide systems and methods for ranking communities based on members of the communities. It should be appreciated that the implementations described in the present disclosure may be implemented in numerous ways, e.g., a process, an apparatus, a system, a device or a method on a computer-readable medium. Various implementations of the present disclosure are described below.

In a variety of implementations, a manner of ranking communities within a social network is described. The communities may be ranked based on reputations of members of the communities. For example, when a famous soccer player joins a first community and a famous soccer player does not join a second community, and when a user does a search for soccer communities via a search engine, the first community is ranked as being more relevant compared to the second community. As another example, a higher reputed professor of botany joins a first botany community and a lower reputed professor joins a second botany community. Then, when a user searches for a botany community via a search engine, the botany community joined by the higher reputed professor is ranked first compared to the second botany community joined by the lower reputed professor.

In several implementations, a method is described. The method includes receiving a search query. The search query is received from a first user of a social network. The method further includes determining communities associated with the social network. Each community includes one or more posts. The one or more posts in a community are received from one or more members of the community. The method includes examining reputations of the members of the communities that satisfy the content match and ranking the communities based on the examination of the reputations of the members for presentation of the communities in a ranked order on a client device in response to the search query. The method is executed by one or more processors.

These and other implementations can include one or more of the following features.

In a number of implementations, each community has an owner and an administrator.

In some implementations, the operation of ranking the communities is performed based on areas of expertise of the members.

In several implementations, the operation of ranking the communities is performed based on levels of interaction of the members with the communities.

In a number of implementations, the method includes determining the levels of interaction based on quantities of the interaction of the members with the communities, qualities of the interaction, or a combination thereof.

In some implementations, the quantities of the interaction include a number of posts within the communities by the members, a number of shares of the posts by the members, a number of times the posts are indicated as liked by the members, or a combination thereof.

In several implementations, the qualities of the interaction include whether the members are reading from the communities, adding comments to the communities, sharing posts of the communities, indicating likeness towards to the posts, or a combination thereof.

In various implementations, the operation of ranking the communities is performed based on a location of the first user and locations of the communities.

In some implementations, the operation of ranking the communities is performed based on one or more preference languages of the first user and languages used by the members within the communities.

In various implementations, the operation of ranking the communities is performed based on numbers of users that are the members of the communities and that are social network friends of the first user.

In several implementations, the operation of ranking the communities is performed based on whether the communities are associated with spam.

In various implementations, the operation of ranking the communities is performed based on rates at which the members join the communities.

In some implementations, the operation of ranking the communities is performed based on rates at which the members leave the communities.

In several implementations, the operation of ranking the communities is performed based on rates at which the members join and leave the communities.

In various implementations, the operation of ranking the communities is performed based on ratios of numbers of posts made within the communities by the members and numbers of the members.

In some implementations, the operation of ranking the communities is performed based on a weighted combination of the levels of reputation of the members, areas of expertise of the members, levels of association of the members with the communities, match between a location of the first user and locations of the communities, match between one or more preference languages of the first user and languages used by the members within the communities, numbers of users that are the members of the communities and that are social network friends of the first user, associations of the communities with spam, rates at which the members join the communities during a time period, rates at which the members leave the communities during a time period, rates at which the members that join and leave the communities within a time period, and ratios of numbers of posts made within the communities by the members and numbers of the members.

In some implementations, the operation of ranking the communities is performed based on dates of latest interactions of the members with the communities.

In several implementations, the interactions include posting to the communities, sharing posts within the communities, indicating likeness towards posts within the communities, commenting on posts within the communities, or a combination thereof.

In various implementations, the operation of ranking the communities is performed based on dates of creations of the communities.

In some implementations, the ranked order places a higher rank to communities with members having higher reputations.

In several implementations, a server system is described. The server system includes one or more processors. The one or more processors are configured to receive a search query. The search query is received from a user of a social network. The one or more processors are further configured to determine communities associated with the social network. Each community includes one or more posts. The one or more posts in a community are received from one or more members of the community. The one or more processors are configured to examine reputations of the members of the communities that satisfy the content match and rank the communities based on the examination of the reputations of the members for presentation of the communities in a ranked order on a client device in response to the search query. The server system also includes one or more memory devices configured to store user accounts associated with the user and the members.

These and other implementations can include one or more of the following features.

In various implementations, each community has an owner and an administrator.

In some implementations, a non-transitory computer-readable medium encoding instructions is described. The instructions in response to execution by a computing device cause the computing device to perform operations. The operations include receiving a search query. The search query is received from a user of a social network. The operations further include determining communities associated with the social network. Each community includes one or more posts. The one or more posts in a community are received from one or more members of the community. The operations include examining reputations of the members of the communities that satisfy the content match and ranking the communities based on the examination of the reputations of the members for presentation of the communities in a ranked order on a client device in response to the search query.

These and other implementations can include one or more of the following features.

In several implementations, each community has an owner and an administrator.

These implementations may provide one or more of the following advantages. For example, various users are looking for communities to join, e.g., ones with reputable members. However, when they access their social network accounts via the World Wide Web, there may be a lack of availability of a tool that allows the users to view ranking of the communities based on reputation. The present disclosure describes a tool, e.g., a computer program, that ranks communities based on reputation of members of the communities. When search results for the search are returned, the communities are ranked based on reputations of the members and the users may select a community that is ranked at the top.

Other aspects will become apparent from the following detailed description, taken in conjunction with the accompanying drawings.

BRIEF DESCRIPTION OF THE DRAWINGS

Various implementations of the present disclosure may best be understood by reference to the following description taken in conjunction with the accompanying drawings.

DETAILED DESCRIPTION

The following implementations describe systems and methods for ranking communities based on members of the communities.

Figure 1:
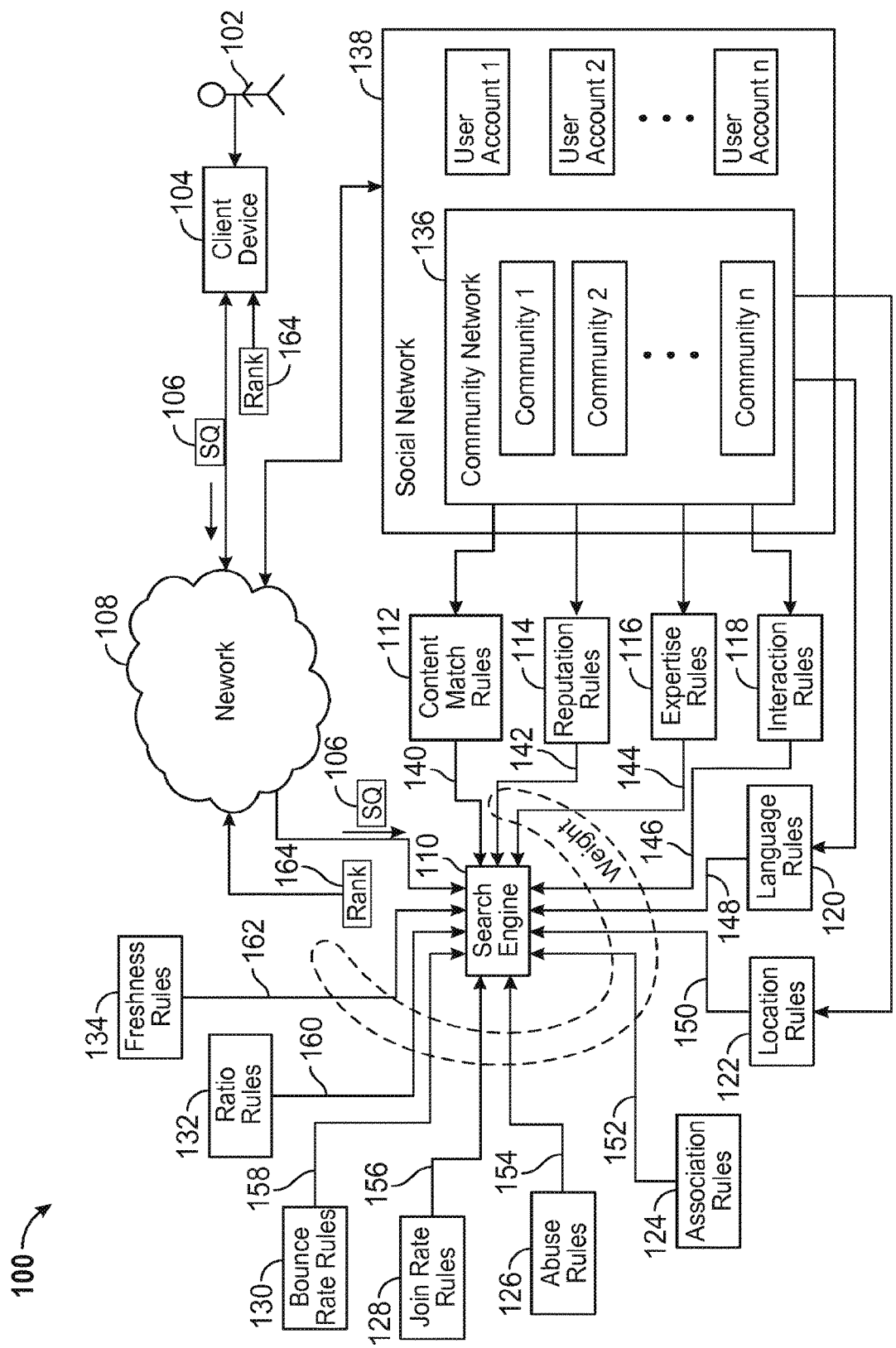
FIG. 1 is a block diagram of a system for ranking communities based on members, in accordance with various implementations of the present disclosure.

FIG. 1 is a block diagram of a system 100 for ranking communities based on members, in accordance with several implementations described in the present disclosure. A user 102 uses his/her/its client device 104 to generate and send a search query 106, which is a web search query. A search query can include search terms, e.g., including characters, letters, numbers, which can form search directives or hyperlinks, images, etc. For example, the user 102 enters the search query 106 into a search engine 110, which is a web search engine, to obtain information via the World Wide Web. As another example, the user 102 enters plain text, videos, images, animations, and/or hypertext via an input device of the client device 104. As yet another example, the user 102 enters videos, images, animations, plain text, hypertext, and/or optional search-directives, e.g., and, or, etc., via the input device of the client device 104. Examples of a client device include a smart phone, a desktop computer, a laptop computer, a tablet, etc. Examples of an input device are provided below.

The search query 106 is sent via a network 108 to be received by the search engine 110. The search engine 110 is executed by one or more processors. For example, the search engine 110 is executed by one or more processors of one or more servers, which are described below. Examples of a processor include an application specific integrated circuit (ASIC), a programmable logic device (PLD), a microprocessor, a central processing unit (CPU), etc. An example of the server is provided below. Examples of the network 108 include a wired network, a combination of a wireless network and a wired network, a local area network (LAN), a wide area network (WAN), a combination of WAN and a LAN, the Internet, an Intranet, and a combination of the Internet and an Intranet.

The search engine 110 receives the search query 106 and applies one or more rules, e.g., content match rules 112, reputation rules 114, expertise rules 116, interaction rules 118, language rules 120, location rules 122, association rules 124, abuse rules 126, join rate rules 128, bounce rate rules 130, ratio rules 132, freshness rules 134, a combination thereof, etc., to mine a community network 136, which is a database of community accounts. As an example, the search engine 110 access real-time information from web pages by running a web crawler computer program, which is stored in one or more memory devices coupled to the one or more servers. Examples of a memory device include a read-only memory (ROM) device, a random access memory (RAM) device, or a combination thereof. A memory device may be a Flash memory, a redundant array of disks (RAID), etc.

Communities 1 thru M of the community network 136 are community accounts, which are web accounts stored in one or more memory devices coupled to the one or more servers, where M is an integer greater than zero. Each community 1 thru M is created by an owner of the community and may be transferred from the owner to an administrator of the community. For example, an entity or a person may create a community. In this example, when the entity or the person is unwilling to be the owner, the owner transfers administration of the community to the administrator. The community network 136 is stored within one or more memory devices that are accessed by the one or more servers. In a number of implementations, the community network 136 includes a computer program that allows creation, management, and/or deletion, of the communities 1 thru M. In these implementations, the community network 136 is executed by one or more processors of the one or more servers.

In some implementations, a community is identified with a community identification (ID) that is assigned by one or more processors of the one or more servers once the community is created. In various implementations, a community includes one or more posts, e.g., posts of texts, posts of videos, posts of images, posts of multimedia, posts of animations, etc.

In some implementations, a community can be administered through use of access control lists.

When a user, e.g. an entity, a person, etc., joins a community, the user becomes a member of the community and may participate in conversations, e.g., posts, conversation threads, comments to posts, uploads of videos, images, animations, etc., within the communities. In some implementations, a conversation thread includes a post, an indication of likeness of the post, a comment to the post, an indication of likeness of the comment, etc. In a number of implementations, an upload of videos, images, animations, etc. is part of a post or a comment.

A membership to a community may be dependent on permission to join the community from the owner or administrator of the community, may be based on an invitation to join the community from the owner or administrator, or may be open to all users. For example, a user requests the owner or administrator to join a community. The owner or administrator checks a profile, e.g., a social network profile, of the user to decide whether to allow the user to join. As another example, the owner or administrator performs a check on a profile of a user to determine whether the profile is authentic. Upon determining that the profile is authentic, the owner or administrator sends an invitation to the user via the community network 136 to become a member of the community. When the user accepts the invitation, the user becomes the member.

In a number of implementations, a user that is not a member of a community has limited interaction, e.g., is not allowed to interact, etc. with the community. For example, a user that is a non-member of a community is not allowed to post to the community, is not allowed to provide comments to posts within the community, cannot access information identifying members of the community, cannot search for information within the community, cannot upload videos, images, animations, etc. to the community, a combination thereof, etc.

In some implementations, the owner or administrator may remove membership of one or more users. For example, upon determining that one or more users are abusing a community, the owner of administrator cancels memberships of the one or more users. Upon cancellation of membership, the one or more users have limited interaction with the community. In various implementations, a user is a user account, which is described below.

In some implementations, each community can be created by one or more members of the community and each member is a user of a social network 138. For example, a community may be created by an owner. Moreover, in several implementations, ownership of a community may be transferred from an owner to a member of the community that may be designated or assigned to be an administrator. In some implementations, one or more users join a community to become members of the community. For example, one or more users of the social network 138 are invited by an owner or an administrator of a community to join the community. As another example, one or more users may request an owner or an administrator of a community to join the community. In various implementations, a member of a community accesses posts, comments, uploads, etc. posted by other members of the community. In some implementations, the members of a community, because they are members of the community, can access the various posts, comments, videos, animations, images, multimedia, etc., posted by other members without a need to obtain permission from the other members. In a variety of implementations, a member of a community can access information identifying one or more other members of the community.

In some implementations, posts, comments, uploads, etc., within a private community is accessible to an owner of the community, an administrator of the community, and to a member of the community. In various implementations, posts, comments, uploads, etc., within a public community may be accessible to all users of the social network 138.

In various implementations, a social group is created by a user of the social network 138 and the user selects other users that may be within his/her/its social network to join the social group. For example, a user creates a name of a social group and selects and drags, via an input device of a client device, information identifying other users to include the other users as members of the social group. In several implementations, a first user of the social network 138 can add a second user of the social network 138 to a social group created by the first user without a need to obtain permission from the second user and/or without receiving an invitation from the second user to join the social group. In some implementations, a first user of a social group cannot access posts, uploads, comments, etc., posted by a second user of the social group, which is created by the second user. In various implementations, a user of a social group cannot post to the social group that is created by another user, who created the social group. In some implementations, a user of a social group can comment on a post created within the social group by another user, who has created the social group. In a variety of implementations, a user of a social group cannot access information identifying one or more other users of the social group.

By comparison, a community provides access to posts, comments, uploads, etc. to all members of the community. A social group provides limited or no access to posts, comments, uploads, etc. posted by a creator of the social group to users that join the social group. Moreover, a user can join a community after obtaining permission from an owner or an administrator or after requesting the owner or administrator to allow joining the community. A creator of a social group can add a user to the social group without obtaining permission from the user.

Each community 1 thru M is a part of the social network 138, which includes one or more user accounts. In several implementations, a social network is provided upon execution of a social network service, which is an online service, online platform, or a web site that focuses on facilitating building of social relations among users. A social network service provides features via a web browser to allow users to stay in touch with each other. For example, a social network service provides a website for a user to post multimedia, receive multimedia from another user, share information with other users, chat with other users, search for other users, and/or categorize users as family, friends, acquaintances, etc. The social network 138 includes a number of user accounts 1 thru N, where N is an integer greater than zero. A user account of the social network 138 is a web account that allows a user to communicate via the social network 138 with other users. For example, a user posts information, e.g., text, animation, videos, images, multimedia, etc. within his/her/its user account of the social network 138 for other users of the social network 138 to access the information. As another example, a user indicates within his/her/its user account of the social network 138 to other users of the social network 138 that he/she/it liked a post, a comment to a post, etc. In some implementations, a comment to a post is a post.

The social network 138 is stored in one or more memory devices of the one or more servers. In a number of implementations, the social network 138 includes a computer program that allows creation, management, and/or deletion, of the user accounts 1 thru N. In these implementations, the social network 138 is executed by one or more processors of the one or more servers.

One or more processors of the one or more servers apply the content match rules 112 to provide scores to one or more of the communities 1 thru M. For example, it is determined whether there is a match between content within the search query 106 and information identifying one or more of the communities 1 thru M to generate a rank 140. Upon determining that there is content match between the search query 106 and information identifying the communities 1 and 2 and lack of content match between the information identifying the communities 3 thru M and the search query 106, the communities 1 and 2 are provided a higher score than that provided to the communities 3 thru M. When the communities 1 and 2 are provided the higher scores, the communities are ranked as being more relevant than the communities 3 thru M. As another example, the content match rules 112 are rules applied by a search engine to generate search results. Examples of the search query 106 include a query that includes search terms "pop music", a query that includes a term "shoes", a query that includes search terms "pop artist", a query that includes search terms "pop star", etc.

After application of the content match rules 112, the one or more processors of the one or more servers apply the reputation rules 114 to modify the rank 140 based on levels of reputations of one or more members of one or more of the communities 1 thru M. The rank 140 is modified by applying the reputation rules 114 to generate a rank 142. For example, after determining that based on application of the content match rules 112, two communities having the terms "pop artist" are ranked number 1 and 2 within the rank 140, a determination is made whether a pop star A that is a member of the community 1 having the terms "pop artist" is more reputable than a pop star B that is a member of the community 2 also having the terms "pop artist". Upon determining that the pop star A is more reputable than the pop star B, the rank 140 is modified to generate a rank, which indicates that the community 1 be listed higher than the community 2. As another example, after determining that based on application of the content match rules 112, two communities having the terms "pop artist" are ranked number 1 and 2 within the rank 140, a determination is made whether a pop star has endorsed community 1 and whether the community 2 is endorsed by any pop star. Upon determining that the community 1 is endorsed by a pop star A and that the community 2 is not endorsed any pop star, the community 1 is ranked as being more relevant than the community 2. It should be noted that a pop star may endorse a community in one or more ways, e.g., by indicating likeness towards the community via an input device of a client device, by communicating via telephone, electronic messaging service, in person etc., with an owner or administrator of the community that the pop star supports the community, etc.

APPLICATION

It should be noted that the reputations, e.g., levels of the reputations, of the pop stars are stored within a database within one or more memory devices of the one or more servers. For example, a level of reputation is determined based on a number of users following a reputable user. Whether a user follows another user is indicated within the social network 138 via an input device of a client device.

In several implementations, a reputation is a reputation of a user is associated with a product or a service that the user is familiar with, e.g., regarding which the user is an expert. Examples of a product include baseball, violin, computer, desktop computers, smart phones, companies, stocks, stationery, furniture, etc. Examples of a service include an electronic messaging service, a financial service, a legal service, a medical service, a construction service, a nanny service, etc.

It should further be noted that although pop artist communities are provided as an example herein in the present disclosure, any other types of communities associated with a product, service, person, emotion, or any other topic around which users might wish to form a community, e.g., soccer player communities, music communities, cooking communities, basketball player communities, sports communities, violin communities, baseball communities, golf club communities, like communities, friend communities, dislike communities, etc., may be used.

After determining the rank 140, one or more processors of the one or more servers apply the expertise rules 116 to modify the rank 140. The rank 140 is modified by applying the expertise rules 116 to generate a rank 144. The expertise rules 116 are associated with areas of expertise. Examples of areas of expertise include tennis, volleyball, sports, cooking, culture, energy drinks, trees, botany, etc. In various implementations, areas of expertise include an area associated with a product, a service, an emotion, etc.

To illustrate the expertise rules 116, after determining that based on application of the content match rules 112, the communities 1 and 2 having the terms "pop star" are ranked number 1 and 2 within the rank 140, a determination is made whether the pop star A converses more about pop music within the community 1 than conversations of the pop star B about pop music within the community 2. For example, it is determined whether a number of posts regarding pop music made within the community 1 by the pop star A is greater than a number of posts regarding pop music made within the community 2 by the pop star B. Upon determining that the number of posts regarding pop music made within the community 1 by the pop star A is greater than a number of posts regarding pop music made within the community 2 by the pop star B, it is determined that the community 1 be ranked as being more relevant than the community 2 to generate a rank.

In several implementations, instead of a number of posts, any other metric, e.g., number of comments made by a pop star to a post within a community, number of videos, audios, multimedia, animations, etc., posted within a community by a pop star, etc., or a combination of the number of posts posted by a pop star within a community, the number of comments, and the number of videos, audios, multimedia, animations, etc. may be used to determine an area of expertise of a community.

As an illustration of application of the expertise rules, a determination is made whether content of posts, comments, uploads, etc., within the community 1 is about pop music and whether content of posts, comments, uploads, etc. within the community 2 is about pop music. It should be noted that the determinations regarding the content of posts is made after determining that based on application of the content match rules 112, the communities 1 and 2 having the search terms "pop music" are ranked number 1 and 2 within the rank 140. Upon determining that the content of posts, comments, uploads, etc., within the community 1 is about pop music and that the content of posts, comments, uploads, etc., within the community 1 is not about pop music, it is determined that community 1 be ranked as being more relevant than the community 2.

In several implementations, whether content within a community is about a product, service, emotion, a topic, etc., is determined based on whether a statistical amount, e.g., majority, total, etc. of characters that describe the product, service, or emotion is within the community. For example, one or more processors of the one or more servers perform matching between a word "pop music" and characters within the community 1 and between the word and characters within the community 2. Upon determining that a majority of posts, comments, uploads, etc., within the community 1 include the word "pop music" and upon determining that a majority of posts, comments, uploads, etc., within the community 2 do not include the word "pop music", the community 1 is ranked as being more relevant than the community 2.

After generating the rank 140, one or more processors of the one or more servers apply the interaction rules 118 to modify the rank 140. The rank 140 is modified by applying the interaction rules 118 to generate a rank 146. The interaction rules 118 determine a level of interaction of a member of a community with the community. Examples of the level of interaction include a quantity of interaction, a quality of interaction, or a combination thereof. The quantity of interaction of a member with a community is determined based on a number of posts within the community by the member, a number of times the posts are shared by the member with the community, a number of times the posts are indicated as liked by the member, or a combination thereof. For example, upon determining that the pop star A has posted more within the community 1 than a number of posts made by the pop star B within the community 2, the community 1 is ranked as being more relevant than the community 2. As another example, upon determining that the pop star A has posted a higher number of comments within the community 1 than a number of comments made by the pop star B within the community 2, it is determined that the community 1 be ranked as being more relevant than the community 2.

The quality of interaction of a member with a community is determined based on whether the member is reading posts within the community, writing posts to the community, sharing the posts, commenting on the posts, indicating likeness towards to the posts, or a combination thereof. For example, upon determining that the pop star A posts to the community 1 and the pop star B reads posts, comments, etc., from the community B, it is determined that the community 1 be ranked as being more relevant than the community 2. As another example, upon determining that the pop star A posts to the community 1 and the pop star B indicates likeness towards posts within the community 2, the community 1 is ranked as being more relevant than the community 2.

In several implementations, an act of writing posts or an act of commenting to a post takes more effort than an act of sharing a post or an act of indicating likeness towards a post. A community that includes more acts of writing posts and/or commenting on posts compared to acts of sharing posts and/or indicating likeness towards posts has a higher quality of interactions between members of the community. The community has the higher quality of interaction than a community that includes more acts of sharing posts and/or indicating likeness towards posts than acts of writing posts and/or commenting on posts.

As an illustration of application of the interaction rules 118, it is determined whether a level of interaction of the pop star A with the community 1 is higher than a level of interaction of the pop star B with the community 2. Upon determining that the level of interaction of the pop star A with the community 1 is higher than the level of interaction of the pop star B with the community 2, the community 1 is ranked as being more relevant than the community 2 to generate a rank.

After generating the rank 140, one or more processors of the one or more servers apply the language rules 120 to modify the rank 140. The rank 140 is modified by using the language rules 120 to generate a rank 148. For example, the user 102 indicates, via the input device of the client device 104, one or more preferred languages of the user 102. Examples of languages include English, Spanish, Chinese, Hindi, German, French, etc. The one or more preferred languages may be stored as part of a profile of the user 102. The profile is maintained within the social network 138. Moreover, in the example, it is determined whether a statistical amount of members of the community 1 converse in a first set of one or more languages in the community 1 and whether a statistical amount of members of the community 2 converse in a second set of one or more languages in the community 2. Examples of a statistical amount, as used herein, include a majority, total number, etc. It should further be noted that in some implementations, instead of determining one or more languages based on conversations of members within a community, the members provide an indication of use of the one or more languages to the community network 138 via input devices of their corresponding client devices. In various implementations, instead of determining one or more languages based on conversations of members within a community, one or more languages used by members of the community are indicated within social network profiles of the members. Upon determining that there is a match between the one or more preferred languages and the one or more languages of the first set and that there is a mismatch between the one or more preferred languages and the one or more languages of the second set, it is determined that the community 1 be ranked as being more relevant than the community 2.

After generating the rank 140, one or more processors of the one or more servers apply the location rules 122 to modify the rank 140. The rank 140 is modified using the location rules 120 to generate a rank 150. As an example, the location rules 120 determine a location of the user 102 and locations of a statistical amount of members of the communities 1 and 2. Upon determining that the location of the user 102 matches the locations of the statistical amount of members of the community 1 and does not match the locations of the statistical amount of members of the community 2, it is determined that the community 1 be ranked as being more relevant than the community 2. It should be noted that in some implementations, a location of a statistical amount of members of a community is a location of the community.

It should be noted that location of the user 102 may be obtained based on a location of the client device 104. For example, the client device 104 includes a global positioning system (GPS) transceiver that is used to determine a location of the client device 104. In some implementations, the user 102 provides his/her/its location within a profile that is maintained within the social network 138.

Moreover, it should be noted that locations of a statistical amount of members within a community is determined based on locations of client devices that are operated by the members. In various implementations, locations of a statistical amount of members within a community is determined based on locations provided within profiles that are maintained within the social network 138. In some implementations, a location of a statistical amount of members within a community is obtained from metadata about the community. In several implementation, an owner selects via an input device of a client device one or more locations of a community that is created by the owner. In some implementations, an administrator selects via an input device of a client device one or more locations of a community that is transferred to the administrator.

Upon applying the content match rules 112 to determine the rank 140, one or more processors of the one or more servers apply the association rules 124 to modify the rank 140. The rank 140 is modified by applying the association rules 124 to generate a rank 152. For example, it is determined whether the community 1 includes a higher number of social network friends of the user 102 that that included within the community 2. Upon determining that the community 1 includes the higher number of social network friends of the user 102, the community 1 is ranked as being more relevant than the community 2.

After generating the rank 140, one or more processors of the one or more servers apply the abuse rules 126 to modify the rank 140. The rank 140 is modified by applying the abuse rules 126 to generate a rank 154. For example, it is determined whether the community 2 is associated with spam and the community 1 is not associated with spam. For example, it is determined whether a community includes spam. To determine whether a community includes spam, a number of keywords used within the community, within a title of the community, within a combination thereof, etc. are determined. The keywords may be used within a title of a community, a brief description of the community, metadata of the community, conversations occurring within the community, a combination thereof, etc. As an example, to determine whether a community is associated with spam, it is determined whether the community is created by an owner that is associated with spam and/or has members that are associated with spam. To determine whether a user, e.g., a member, an owner, an administrator, etc. is associated with spam, it is determined whether the user is involved in creating spam in communities, on the World Wide Web, in electronic messages, in user accounts, etc. In some implementations, it is determined whether information identifying the user, e.g., user name, electronic message address, metadata of the user, social network profile of the user, etc. is used to create spam, e.g., send electronic message with spam, etc. Upon determining that the information identifying the user is used to create spam, it is determined that the user is associated with spam. Upon determining that the community 2 is associated with spam and the community 1 is not, the community 1 is ranked as being more relevant than the community 2.

As another example, it is determined whether a malware is associated with a community to modify the rank 140 to further generate the rank 154. As yet another example, it is determined whether a combination of spam and malware is associated with a community to determine whether to modify the rank 140 to further generate the rank 154. In several implementations, it is determined whether the community 2 includes a higher amount of spam than that included within the community 1 to modify the rank 140 to further generate the rank 154. An amount of spam is determined by a number of keywords used within the community, a title of the community, a combination thereof, etc.

Upon determining the rank 140, one or more processor of the one or more servers apply the join rate rules 128 to modify the rank 140. The rank 140 is modified by using the join rate rules 128 to generate a rank 156. For example, it is determined whether a higher number of members of community 1 joined the community 1 within a pre-determined time period than a number of members of community 2 that joined the community 2 within the pre-determined time period. Upon determining that the higher number of members of community 1 joined the community 1 within the pre-determined time period, the community 1 is ranked as being more relevant than the community 2.

It should be noted that in several implementations, a user may get an invitation via the community network 138 from an owner or an administrator of a community to join the community and may reject the invitation to join the community. For example, the owner of administrator may select an invite button displayed on a client device to invite to user to join one of the communities 1 thru M. The user rejects the invitation by selecting a decline button, e.g., reject button, etc., via an input device of a client device to indicate rejection of the invitation to join one of the communities 1 thru M. In some implementations, an owner or administrator may get a request to join a community via the community network 138 from a user and the owner or administrator may reject the request to join the community. Rejections of invitations within a community and/or rejections of requests to join the community reduces a rate at which users join the community.

After generating the rank 140, one or more processors of the one or more servers apply the bounce rate rules 130 to determine whether to modify the rank 140. The rank 140 is modified using the bounce rate rules 130 to generate a rank 158. For example, it is determined whether a higher number of members of community 2 left the community 2 within a pre-determined time period than a number of members of community 1 that left the community 1 within the pre-determined time period. Upon determining that the higher number of members of community 2 left the community 2 within the pre-determined time period, the community 1 is ranked as being more relevant than the community 2. A member leaves a community when the member deletes his/her/its user account within the social network 138, when the member indicates to the community network 36 via the input device of the client device 136 that the member will leave the community, etc.

As another example of application of the bounce rate rues 130, it is determined whether a higher number of members of community 2 joined and left the community 2 within a pre-determined time period than a number of members of community 1 that joined and left the community 1 within the pre-determined time period. Upon determining that the higher number of members of community 2 joined and left the community 2 within the pre-determined time period, the community 1 is ranked as being more relevant than the community 2.

After determining the rank 140, one or more processors of the one or more servers apply the ratio rules 132 to modify the rank 140. The rank 140 is modified by applying the ratio rules 132 to generate a rank 160. For example, it is determined whether a first ratio of a number of posts, comments, uploads, a combination thereof, etc. within the community 1 to a number of members of the community 1 is less than a second ratio of a number of posts, comments, uploads, a combination thereof, etc. within the community 2 to a number of members of the community 2. Upon determining that the first ratio is less than the second ratio, the community 1 is ranked as being more relevant than the community 2.

As another example, it is determined whether a first number of members posting an amount of posts, comments, uploads, a combination thereof, etc., within the community 1 is greater than a second number of members posting the same amount of posts, comments, uploads, a combination thereof, etc., within the community 2. Upon determining that the first number is greater than the second number, the community 1 is ranked as being more relevant than the community 2.

As yet another example, a preference of the user 102 regarding whether the user likes to participate in discussions or announcements is determined Usually, the community 1 in which discussions take place has a higher first ratio of members of the community 1 to posts, comments, uploads, a combination thereof, etc. within the community 1 compared to the community 2 in which announcements occur. The community 2 in which announcements occur has a lower second ratio of members of the community 2 to posts, comments, uploads, a combination thereof, etc. within the community 2. The preference of the user 102 regarding whether the user likes to participate in discussions or announcements is indicated by the user 102 via the input device of the client device 104 to the social network 138. For example, the preference is indicated within a profile, hobbies, etc. within a user account of the user 102. In several implementations, instead of or in addition to using the indication from the user 102 regarding his/her/its preference regarding whether the user likes to participate in discussions or announcements, the preference of the user 102 is determined based on communities that the user joined. For example, it is determined whether a pre-determined number of communities, e.g., three, four, ten, etc. that the user 102 joined in a pre-determined time window is one in which discussions or announcements take place. Upon determining that discussions take place in the communities of the pre-determined number within the pre-determined time window, it is determined that the user 102 likes to participate in discussions. On the other hand, upon determining that announcements take place in the communities of the pre-determined number within the pre-determined time window, it is determined that the user 102 likes to participate in announcements. Upon determining that the user 102 prefers discussions compared to announcements and determining that the first ratio is higher than the second ratio, it is determined to rank the community 1 higher than the community 2.

Upon determining the rank 140, one or more processors of the one or more servers apply the freshness rules 134 to modify the rank 140. The rank 140 is modified using the freshness rules 134 to generate a rank 162. For example, it is determined whether the community 1 is created after the community 2. Upon determining that the community 1 is created after the community 2, the community 1 is ranked as being more relevant than the community 2. In several implementations, upon determining that the community 1 is created before the community 2, the community 2 may be ranked as being more relevant than the community 1 based on a topic of the communities 1 and 2. For example, upon determining that both communities 1 and 2 are associated with a topic 1, e.g., subject 1, etc., and upon determining that the community 1 is created before the community 2, the community 1 is ranked as being more relevant than the community 2. As another example, upon determining that both communities 1 and 2 are associated with a topic 2, e.g., subject 2, etc., and upon determining that the community 1 is created before the community 2, the community 2 is ranked as being more relevant than the community 1. In several implementations, a determination whether a community is associated with a topic is based on content match between a search term and a topic of a community. As another example of application of the freshness rules 134, it is determined whether a latest post, upload, comment, indication of likeness, a combination thereof, etc. within the community 1 is more recent than a latest post, upload, comment, indication of likeness, a combination thereof, etc. within the community 2. Upon determining so, the community 1 is ranked as being more relevant than the community 2.

A weight W is applied by one or more processors of the one or more servers to the ranks 142, 144, 146, 148, 150, 152, 154, 156, 158, 160, and 162 to generate a rank 164. For example, the rank 142 is weighted higher than one or more of the ranks 144, 146, 148, 150, 152, 154, 156, 158, 160, and 162 to generate the rank 164. As another example, the ranks 142 and 144 are weighted higher than the ranks 146, 148, 150, 152, 154, 156, 158, 160, and 162 to generate the rank 164. As yet another example, one or more of the ranks 142, 144, 146, 148, 150, 152, 154, 156, 158, 160, and 162 are weighted higher than the remaining of the ranks 142, 144, 146, 148, 150, 152, 154, 156, 158, 160, and 162 to generate the rank 164. As another example, upon determining that the pop star A has a higher level of reputation than the pop star B, regardless of determining that a level of interaction of the pop star A with the community 1 is less than an amount of interaction of the pop star B with the community 2, the community 1 is ranked as being more relevant than the community 2 and the ranking is provided within the rank 164. In this example, the rank 146 has lesser weight than the rank 142. Examples of the weight W include a real number.

In some implementations, the weight W is applied to one or more of the ranks 142, 144, 146, 148, 150, 152, 154, 156, 158, 160, and 162 to generate an intermediate rank. One or more processors of the one or more servers apply a set of privacy rules and/or social network profile rules to the intermediate rank to generate the rank 164. As an example, it is determined based on a social network profile of a user whether the user is of a legal age for accessing communities including adult content. Upon determining that the user of not of the legal age, any communities that include adult content are excluded from the intermediate rank and are not ranked in the rank 164. As another example, when a community is designated as private by a creator or an administrator of the community, although the community is ranked after applying one or more of the rules 112, 114, 116, 118, 120, 122, 124, 126, 128, 130, 132, and 134, the community is not ranked in a list. The private community is excluded from being ranked within the rank 164. A community is designated as private via an input device of a client device during creation of the community via the input device.

In several implementations, a community that is designated as private is not ranked by one or more processors of the one or more servers. In various implementations, regardless of whether a community is private, when a user creating the search query 106 has created the private community, the private community is ranked within the rank 164 and is displayed to the user. In some implementations, in addition to a user who creates a private community, the private community is displayed as ranked within the rank 164 to any user who is given permission by an administrator or owner of the community and who has joined the community.

One or more processors of the one or more servers send the rank 164 via the network 108 to the client device 104. The rank 164 is displayed as a search result on the client device 104 to the user 102. The user 102 may decide to select one of the communities 1 thru M that is ranked first.

It should be noted that in several implementations, one or more of the rules 114, 116, 118, 120, 122, 124, 126, 128, 130, 132, and 134 are applied simultaneously with or before applying the rule 112 to generate a rank. For example, the rank 164 is generated without modifying the rank 140.

In various implementations, two or more of the rules 112, 114, 116, 118, 120, 122, 124, 126, 128, 130, 132, and 134 are not applied to generate a rank.

In some implementations, invitation rules are applied by one or more processors of the one or more servers to generate rank. For example, the community 1 to which a statistical amount of users are invited to join by an owner or administrator is ranked as being more relevant than the community 2 to which a statistical number of users are not invited to join. As another example, a community 1 to which a user is invited to join is ranked as being more relevant than the community 2 to which the same or another user is not invited to join. It should be noted that the weight W is applied to the rank generated with the invitation rules in addition to the ranks 142, 144, 146, 148, 150, 152, 154, 156, 158, 160, and 162 to generate the rank 164. In some implementations, two or more of the invitation rules, the rules 112, the rules 114, the rules 116, the rules 120, the rules 122, the rules 124, the rules 126, the rules 128, the rules 130, the rules 132, and the rules 134 are not applied to generate the rank.

Figure 2:
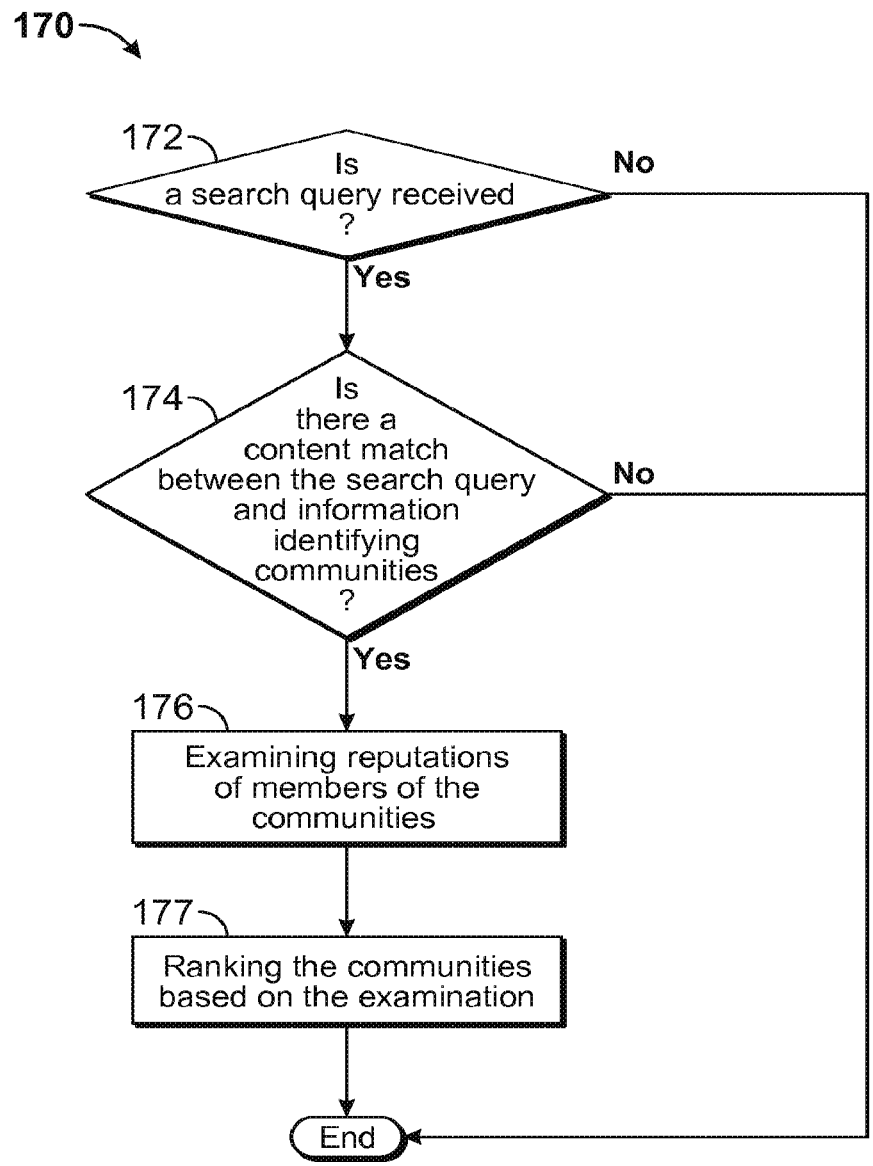
FIG. 2 is a flowchart of a method for ranking the communities based on the members, in accordance with several implementations of the present disclosure.

FIG. 2 is a flowchart of a method 170 for ranking communities based on members, in accordance with various implementations described in the present disclosure. The method 170 is executed by one or more processors of the one or more servers.

In an operation 172, it is determined whether the search query 106 (FIG. 1) is received. For example, it is determined whether one or more characters are received within a search field of the search engine 110 (FIG. 1). As another example, it is determined whether a selection of a search button of the input device of the client device 104 is received after receiving one or more characters of the search query 106. Upon determining that the search query 106 is not received, the method 170 ends.

On the other hand, upon determining that the search query 106 is received, in an operation 174, it is determined whether there is a content match between terms, e.g., characters, of the search query 106 and information identifying one or more of the communities 1 thru M (FIG. 1). For example, it is determined whether there is a match between content within the search query 106 and information identifying one or more of the communities 1 thru M. Upon determining that there is no content match, the method 170 ends.

On the other hand, upon determining that there is content match, in an operation 176, reputations, e.g., levels of reputations, of members of the communities that satisfy the content match of operation 174 are examined. For example, it is determined whether a first statistical amount, e.g., majority, total, etc., of members of the community 1 has a higher reputation than a reputation of second statistical amount of members of the community 2. It should be noted that the reputation of the first statistical amount of members may be a statistical reputation, e.g., average reputation, mean reputation, median reputation, etc. of the members. Similarly, the reputation of the second statistical amount of members may be a statistical reputation, e.g., average reputation, mean reputation, median reputation, etc. of the members. As explained above, a reputation level of each member of a community may be stored in a database.

In an operation 177, the communities that satisfy the content match of the operation 174 are ranked based on the examination of the reputations. Continuing with the preceding example, upon determining that the first statistical amount of members of the community 1 has the higher reputation, it is determined that the community 1 be ranked as being more relevant than the community 2. As another example, the rank 142 (FIG. 1) is generated by applying the reputation rules 114 (FIG. 1). The method 170 ends after the operation 177.

In several implementations, the ranks generated in the operation 177 may be sent by one or more processors of the one or more servers to the client device 104 via the network 108 for presentation, e.g., display, on the client device.

Figure 3A:
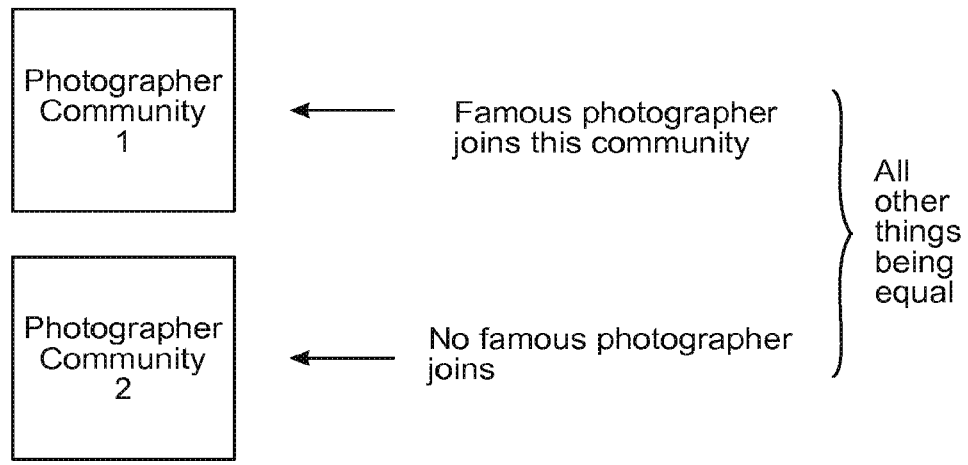
FIG. 3A is a diagram used to illustrate an application of reputation rules for ranking the communities, in accordance with various implementations of the present disclosure.

FIG. 3A is a diagram used to illustrate an application of the reputation rules 114 (FIG. 1), in accordance with several implementations described in the present disclosure. A famous, e.g., well known, in the public eye, renowned, celebrated, noted, etc., photographer joins a photography community 1 and no famous photographer joins a photography community 2. It should be noted that the photography communities 1 and 2 are results of application of the content match rules 112 (FIG. 1). In several implementations, the photography communities 1 and 2 are generated simultaneous with or before applying the content match rules 112. All other things being equal, the photography community 1 is ranked as being more relevant than the photography community 2. It should be noted that in some implementations, as shown in FIG. 3A, all other things being equal means that application of the rules 116, 118, 120, 122, 124, 126, 128, 130, 132, and 134 (FIG. 1), all of which include rules other than the reputation rules 114, results in the same rank of the photography communities 1 and 2.

It should further be noted that instead of photography, any other area of product, service, or emotion, e.g., tennis game, coffee, botany, zoology, cancer, cold symptoms, love, hate, etc., may be used.

Figure 3B:
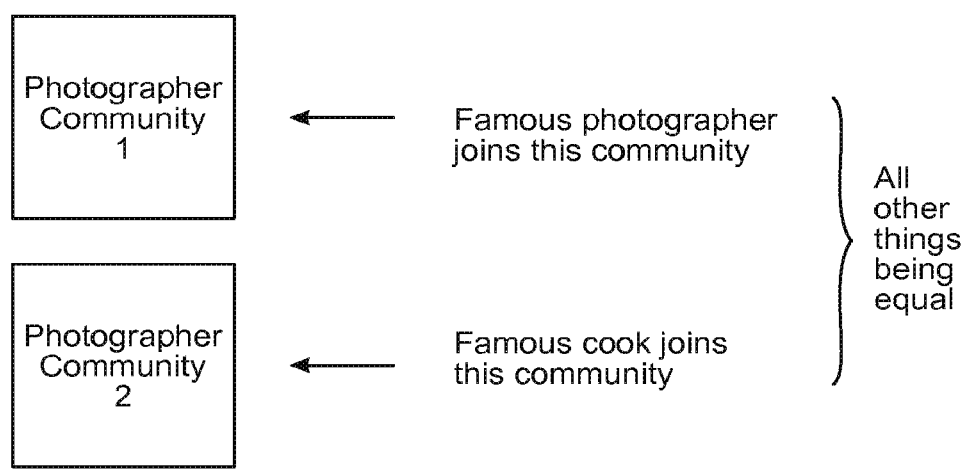
FIG. 3B is a diagram used to illustrate an application of expertise rules for ranking the communities, in accordance with several implementations of the present disclosure.

FIG. 3B is a diagram used to illustrate an application of the expertise rules 116 (FIG. 1), in accordance with various implementations described in the present disclosure. A famous photographer joins the photography community 1 and a famous cook joins the photography community 2. All other things being equal, the photography community 1 is ranked as being more relevant than the photography community 2. It should be noted that in various implementations, all other things being equal as shown in FIG. 3B means that application of the rules 114, 118, 120, 122, 124, 126, 128, 130, 132, and 134 (FIG. 1), all of which include rules other than the expertise rules 116, results in the same rank of the photography communities 1 and 2.

It should also be noted that instead of the famous cook, a member with another area of expertise in a product, service, or emotion, e.g., volleyball, financial service, legal service, badminton, birdie, tennis ball, volleyball game, etc. may be illustrated.

Figure 3C:
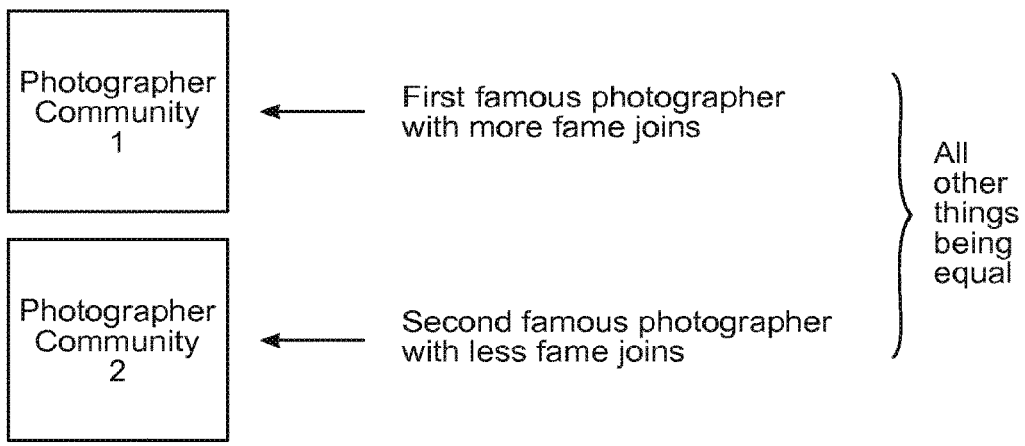
FIG. 3C is a diagram used to illustrate another application of the reputation rules, in accordance with various implementations of the disclosure.

FIG. 3C is a diagram used to illustrate another application of the reputation rules 114, in accordance with several implementations described in the present disclosure. A first famous photographer joins the photography community 1 and a second famous photographer joins the photography community 2. The second famous photographer is less famous than the first famous photographer. An amount of fame is an example of a level of reputation. In several implementations, instead of a user being famous, a user is reputed. All other things being equal, the photography community 1 is ranked as being more relevant than the photography community 2. It should be noted that in various implementations, all other things are equal as shown in FIG. 3C means that application of the rules 116, 118, 120, 122, 124, 126, 128, 130, 132, and 134 (FIG. 1), all of which include rules other than the reputation rules 114, results in the same rank of the photography communities 1 and 2.

Figure 3D:
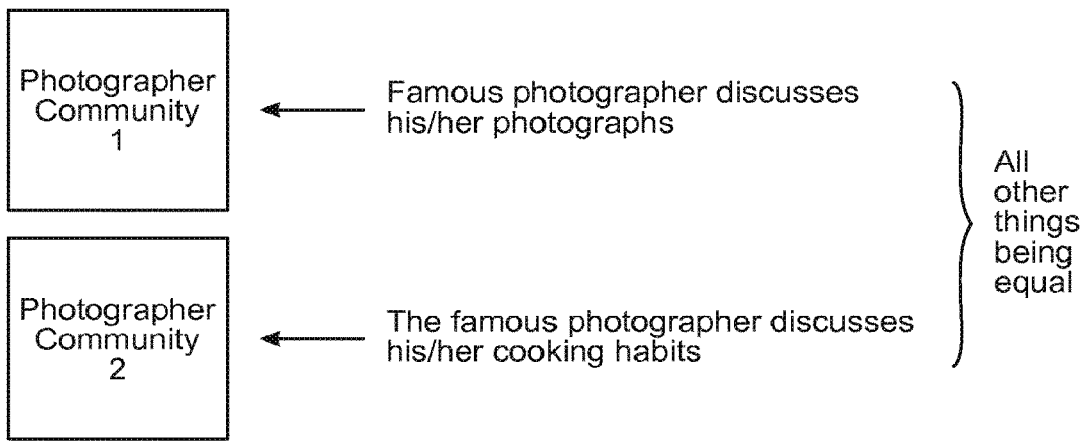
FIG. 3D is a diagram used to illustrate another application of the expertise rules, in accordance with several implementations of the disclosure.

FIG. 3D is a diagram used to illustrate an application of the expertise rules 116 (FIG. 1), in accordance with some implementations described in the present disclosure. A famous photographer joins the photography community 1 and discusses his/her/its photographs with other members of the community 1. A famous photographer, which may the same or other than the photographer that joined the photography community 1, joins the photography community 2 and discusses his/her/its cooking habits with other members of the photography community 2. Cooking is not an area of expertise of a famous photographer and photographs is. All other things being equal, the photography community 1 is ranked as being more relevant than the photography community 2. It should be noted that in various implementations, all other things are equal as shown in FIG. 3D means that application of the rules 114, 118, 120, 122, 124, 126, 128, 130, 132, and 134 (FIG. 1), all of which include rules other than the expertise rules 116, results in the same rank of the photography communities 1 and 2.

In some implementations, instead of cooking habits, any other habits, e.g., cleaning habits, exercising habits, talking habits, physical habits, mental habits, etc. may be used.

Figure 3E:
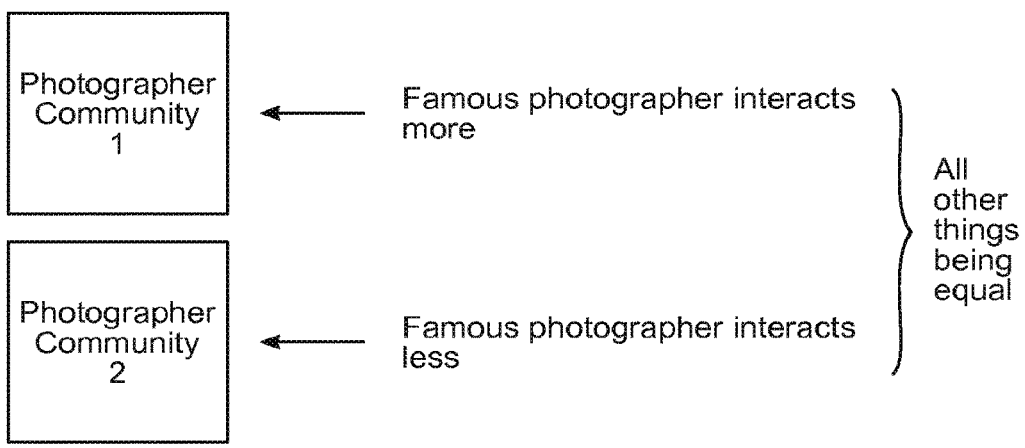
FIG. 3E is a diagram used to illustrate an application of interaction rules for ranking the communities, in accordance with various implementations of the present disclosure.

FIG. 3E is a diagram used to illustrate an application of the interaction rules 118 (FIG. 1), in accordance with several implementations described in the present disclosure. A famous photographer joins a photography community 1 and interacts more with the photography community 1 than an amount, e.g., quantity, etc., of interaction of a famous photographer with the community 2. In some implementations, instead of the quantity of interaction, a quality of interaction or a level of interaction is used. All other things being equal, the photography community 1 is ranked as being more relevant than the photography community 2. It should be noted that in some implementations, all other things are equal as shown in FIG. 3E means that application of the rules 114, 116, 120, 122, 124, 126, 128, 130, 132, and 134 (FIG. 1), all of which include rules other than the interaction rules 118, results in the same rank of the photography communities 1 and 2. It should further be noted that the famous photographer that joins the community 2 may be the same or other than the famous photographer that joins the community 1.

Figure 3F:
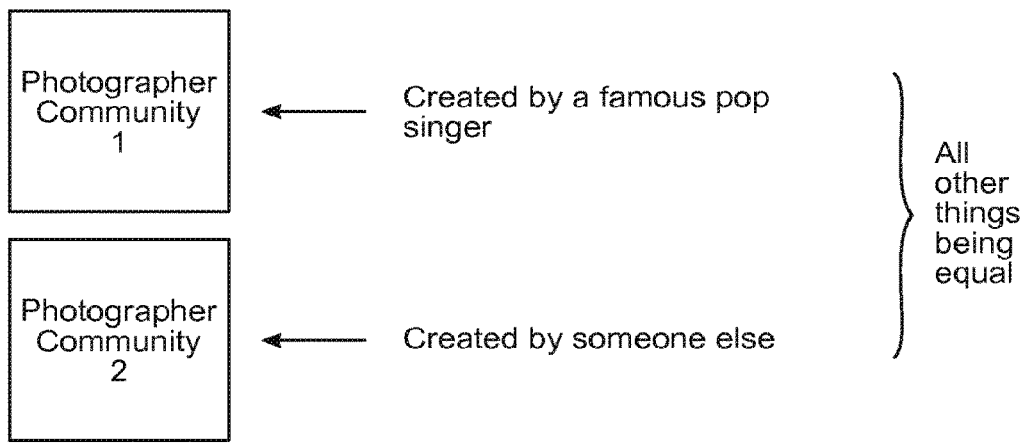
FIG. 3F is a diagram used to illustrate yet another application of the reputation rules, in accordance with several implementations of the present disclosure.

FIG. 3F is a diagram used to illustrate an application of the reputation rules 114 (FIG. 1), in accordance with various implementations described in the present disclosure. A famous pop singer creates a pop singer community 1 and an average member, e.g. someone not famous, someone not reputed, etc., creates a pop singer community 2. It should be noted that the pop singer communities 1 and 2 are results of application of the content match rules 112. In several implementations, the pop singer communities 1 and 2 are generated simultaneous with or before applying the content match rules 112. All other things being equal, the pop singer community 1 is ranked as being more relevant than the pop singer community 2. It should be noted that in various implementations, all other things are equal as shown in FIG. 3F means that application of the rules 116, 118, 120, 122, 124, 126, 128, 130, 132, and 134 (FIG. 1), all of which include rules other than the reputation rules 114, results in the same rank of the pop singer communities 1 and 2. A level of reputation of the average member is less than that of a famous pop singer.

It should also be noted that instead of pop singing, any other area of product, service, or emotion, e.g., guitar, chemistry, mathematics, engineering, patent law, contract law, etc., may be used.

Figure 3G:
FIG. 3G is a diagram used to illustrate an application of location rules for ranking the communities, in accordance with various implementations of the present disclosure.

FIG. 3G is a diagram used to illustrate an application of the location rules 122 (FIG. 1), in accordance with several implementations described in the present disclosure. A first statistical amount of members of the pop singer community 1 are located in United Kingdom and a second statistical amount of members of the pop singer community 2 are located in the United States. It should be noted that the first statistical amount may be the same or different than the second statistical amount. It should further be noted that the first user 102 is located in the United Kingdom. All other things being equal, the pop singer community 1 is ranked as being more relevant than the pop singer community 2. It should be noted that in various implementations, all other things are equal as shown in FIG. 3G means that application of the rules 114, 116, 118, 120, 124, 126, 128, 130, 132, and 134 (FIG. 1), all of which include rules other than the location rules 122, results in the same rank of the pop singer communities 1 and 2.

It should further be noted that instead of United States or United Kingdom, any other geographic location, e.g., Union city, California, Ahmadabad, Vadodara, Peru, Brazil, Germany, France, Paris, etc., may be used. Examples of a geographic location include a city, a state, a country, a county, a landmark, a village, a town, an area of land, a latitude, a longitude, abroad, traveling, an expatriate location, a combination thereof, etc.

Figure 3H:
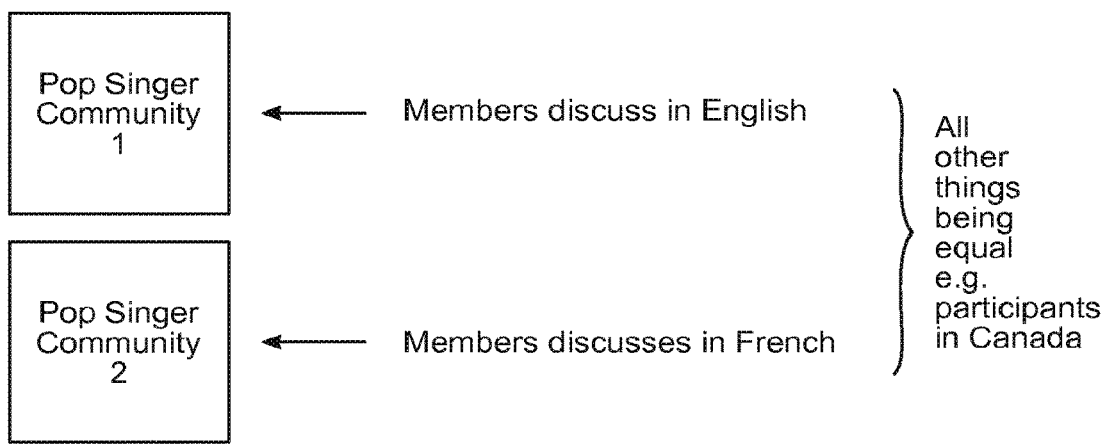
FIG. 3H is a diagram used to illustrate an application of language rules for ranking the communities, in accordance with several implementations of the present disclosure.

FIG. 3H is a diagram used to illustrate an application of the language rules 120 (FIG. 1), in accordance with some implementations described in the present disclosure. A statistical amount of members of the pop singer community 1 discuss, e.g., post, post comments, upload videos, upload images, upload multimedia, upload animations, upload audios, etc., in English within the pop singer community 1 and a statistical amount of members of the pop singer community 2 discuss in French within the pop singer community 2. All other things being equal, the pop singer community 1 is ranked as being more relevant than the pop singer community 2 when the user 102's preferred language is English. It should be noted that in various implementations, all other things are equal as shown in FIG. 3H means that application of the rules 114, 116, 118, 122, 124, 126, 128, 130, 132, and 134 (FIG. 1), all of which include rules other than the language rules 120, results in the same rank of the pop singer communities 1 and 2.

In various implementations, a statistical amount of members of the pop singer community 1 discuss, e.g., post, post comments, upload videos, upload images, upload multimedia, upload animations, upload audios, etc., in French within the pop singer community 1 and a statistical amount of members of the pop singer community 2 discuss in English within the pop singer community 2. All other things being equal, the pop singer community 1 is ranked as being more relevant than the pop singer community 2 when the user 102's preferred language is French.

It should further be noted that in some implementations, instead of English or French, any other language, e.g., Chinese, Mandarin, Hindi, Telugu, Tamil, etc., may be used.

Figure 3I:
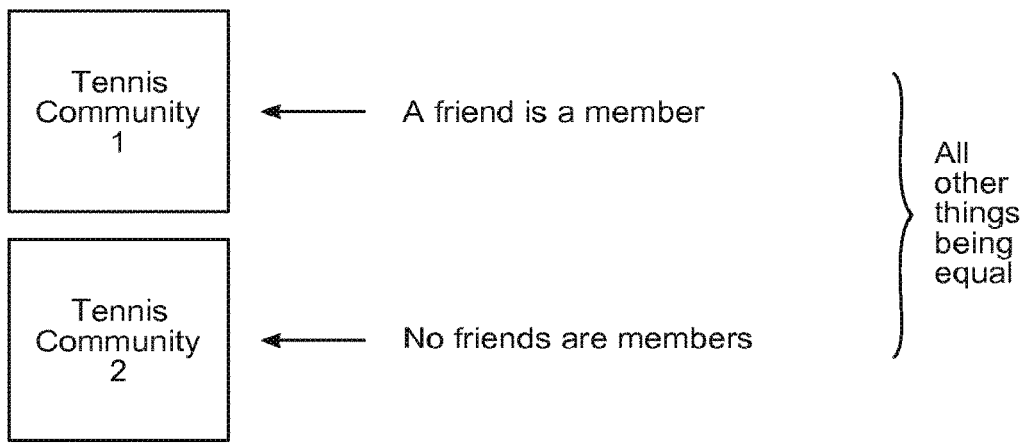
FIG. 3I is a diagram used to illustrate an application of association rules for ranking the communities, in accordance with various implementations of the present disclosure.

FIG. 3I is a diagram used to illustrate an application of the association rules 124 (FIG. 1), in accordance with several implementations described in the present disclosure. A social network friend of the user 102 (FIG. 1) is a member of a tennis community 1 and none of social network friends of the user 102 are members of a tennis community 2. It should be noted that the tennis communities 1 and 2 are results of application of the content match rules 112. In several implementations, the tennis communities 1 and 2 are generated simultaneous with or before applying the content match rules 112. All other things being equal, the tennis community 1 is ranked as being more relevant than the tennis community 2. It should be noted that in some implementations, as shown in FIG. 3I, all other things being equal means that application of the rules 114, 116, 118, 120, 122, 126, 128, 130, 132, and 134 (FIG. 1), all of which include rules other than the association rules 124, results in the same rank of the tennis communities 1 and 2.

It should also be noted that instead of tennis, any other area of product, service, or emotion, e.g., flowers, flour, coffee cups, tea, water, oxygen, etc., may be used.

Figure 3J:
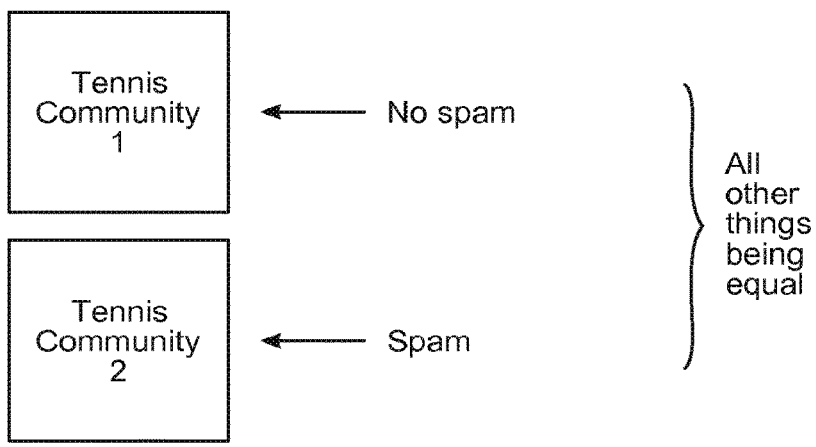
FIG. 3J is a diagram used to illustrate an application of abuse rules for ranking the communities, in accordance with several implementations of the present disclosure.

FIG. 3J is a diagram used to illustrate an application of the abuse rules 126 (FIG. 1), in accordance with various implementations described in the present disclosure. The tennis community 1 lacks spam and the tennis community 2 includes spam. In various implementations, the tennis community 1 includes a lower amount of spam than that in the tennis community 2. All other things being equal, the tennis community 1 is ranked as being more relevant than the tennis community 2. It should be noted that in some implementations, as shown in FIG. 3J, all other things being equal means that application of the rules 114, 116, 118, 120, 122, 124, 128, 130, 132, and 134 (FIG. 1), all of which include rules other than the abuse rules 126, results in the same rank of the tennis communities 1 and 2.

Figure 3K:
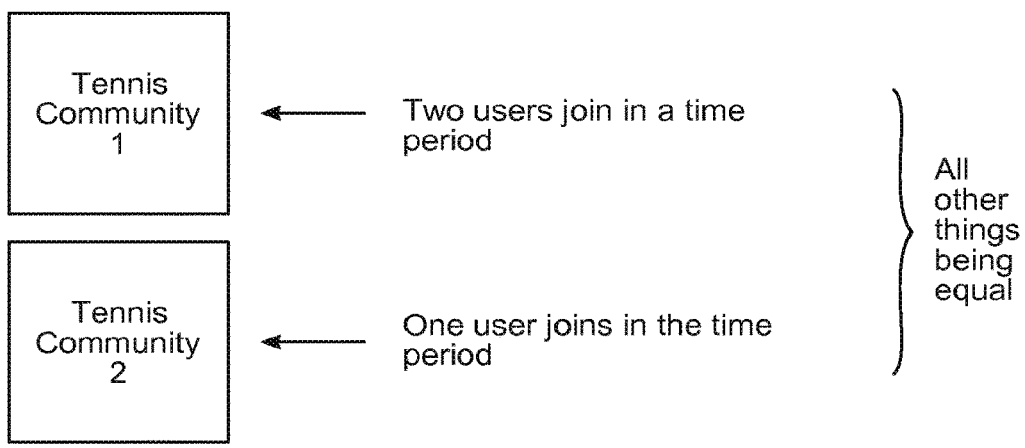
FIG. 3K is a diagram used to illustrate an application of join rate rules for ranking the communities, in accordance with various implementations of the present disclosure.

FIG. 3K is a diagram used to illustrate an application of the join rate rules 128 (FIG. 1), in accordance with several implementations described in the present disclosure. Two users join the tennis community 1 in a time period and one user joins the tennis community 2 in the time period. The time period illustrated using FIG. 3K is stored in one or more memory devices of the one or more servers. It should be noted that in some implementations, instead of one or two users, any other number of users may be used. For example, 15 users may join the tennis community 1 and five users may join the tennis community 2. All other things being equal, the tennis community 1 is ranked as being more relevant than the tennis community 2. It should be noted that in various implementations, as shown in FIG. 3K, all other things being equal means that application of the rules 114, 116, 118, 120, 122, 124, 126, 130, 132, and 134 (FIG. 1), all of which include rules other than the join rate rules 128, results in the same rank of the tennis communities 1 and 2.

Figure 3L:
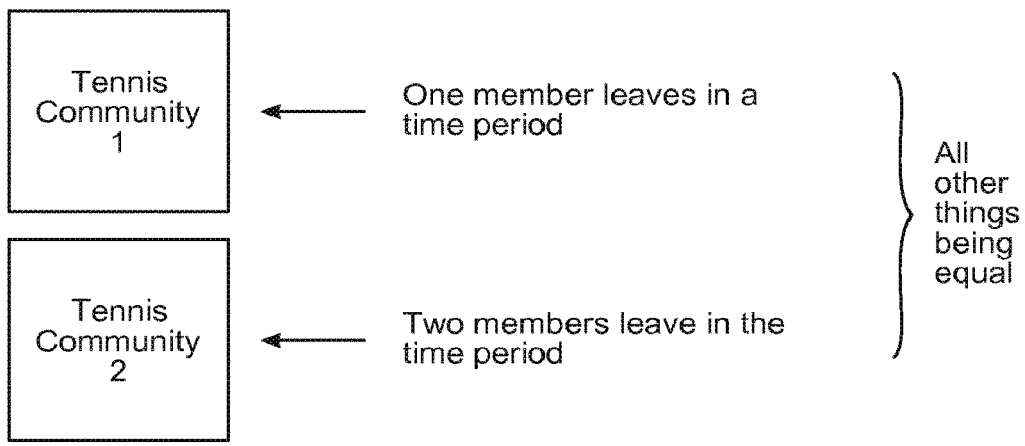
FIG. 3L is a diagram used to illustrate an application of bounce rate rules for ranking the communities, in accordance with several implementations of the present disclosure.

FIG. 3L is a diagram used to illustrate an application of the bounce rate rules 130 (FIG. 1), in accordance with some implementations described in the present disclosure. One member leaves the tennis community 1 in a time period and two members leave the tennis community 2 in the time period. The time period illustrated using FIG. 3L is stored in one or more memory devices of the one or more servers. It should be noted that in some implementations, instead of one or two members, any other number of members may be used. For example, three members may leave the tennis community 1 and 12 members may leave the tennis community 2. All other things being equal, the tennis community 1 is ranked as being more relevant than the tennis community 2. It should be noted that in various implementations, as shown in FIG. 3L, all other things being equal means that application of the rules 114, 116, 118, 120, 122, 124, 126, 128, 132, and 134 (FIG. 1), all of which include rules other than the bounce rate rules 130, results in the same rank of the tennis communities 1 and 2. In several implementations, the tennis community 2 is ranked as being less relevant than the tennis community 1.

Figure 3M:
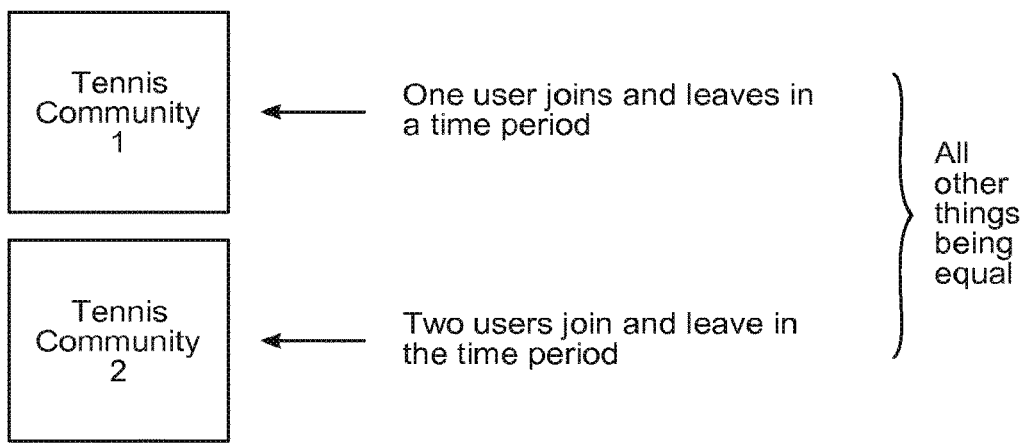
FIG. 3M is a diagram used to illustrate another application of the bounce rate rules, in accordance with various implementations of the present disclosure.

FIG. 3M is a diagram used to illustrate an application of the bounce rate rules 130 (FIG. 1), in accordance with several implementations described in the present disclosure. One user joins as well as leaves the tennis community 1 in a time period and two users join and leave the tennis community 2 in the time period. The time period illustrated using FIG. 3M is stored in one or more memory devices of the one or more servers. It should be noted that in some implementations, instead of one or two users, any other number of users may be used. For example, seven users may join and then leave the tennis community 1 and 20 members may leave the tennis community 2. All other things being equal, the tennis community 1 is ranked as being more relevant than the tennis community 2. It should be noted that in various implementations, as shown in FIG. 3M, all other things being equal means that application of the rules 114, 116, 118, 120, 122, 124, 126, 128, 132, and 134 (FIG. 1), all of which include rules other than the bounce rate rules 130, results in the same rank of the tennis communities 1 and 2.

Figure 3N:
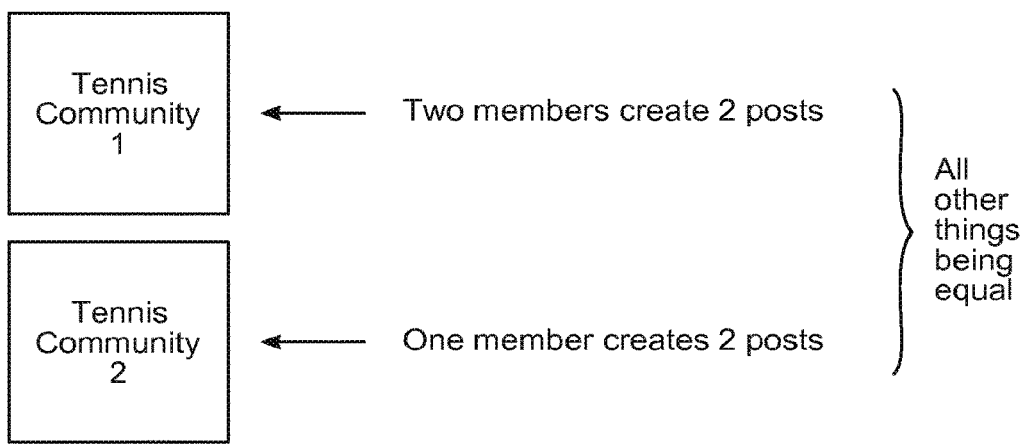
FIG. 3N is a diagram used to illustrate an application of ratio rules for ranking the communities, in accordance with several implementations of the present disclosure.

FIG. 3N is a diagram used to illustrate an application of the ratio rules 132 (FIG. 1), in accordance with some implementations described in the present disclosure. Two members create two posts within the tennis community 1 and one member creates two posts within the tennis community 2. It should be noted that instead of posts, a comment to a post, an upload, a combination of a post, a comment, and an upload, etc. may be created. It should further be noted that in various implementations, instead of two members, any other number of members may be used and instead of one member, any other number of members may be used. The number of members that create a number of posts within the tennis community 2 is less than the number of members that create the same number of posts within the tennis community 1. Moreover, in some implementations, instead of two posts, any other number of posts may be used. All other things being equal, the tennis community 1 is ranked as being more relevant than the tennis community 2. It should be noted that in some implementations, as shown in FIG. 3N, all other things being equal means that application of the rules 114, 116, 118, 120, 122, 124, 126, 128, 130, and 134 (FIG. 1), all of which include rules other than the ratio rules 132, results in the same rank of the tennis communities 1 and 2.

Figure 3O:
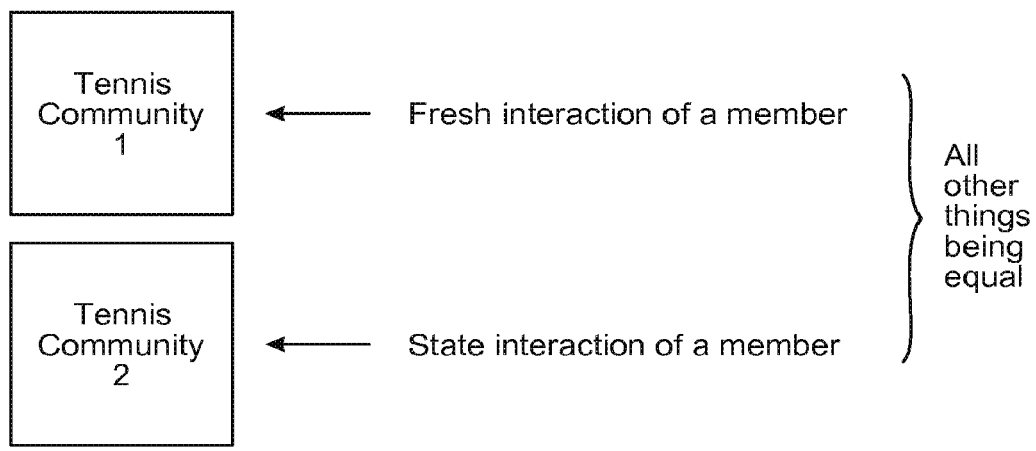
FIG. 3O is a diagram used to illustrate an application of freshness rules for ranking the communities, in accordance with various implementations of the present disclosure.

FIG. 3O is a diagram used to illustrate an application of the freshness rules 134 (FIG. 1), in accordance with several implementations described in the present disclosure. A member of the tennis community 1 has a fresh interaction with the tennis community 1 and a member of the tennis community 2 has a stale interaction with the tennis community 2. For example, the latest interaction of any member of the tennis community 1 with the tennis community 1 is on Nov. 2, 2012 and the latest interaction of any member of the tennis community 2 with the tennis community 2 is on Oct. 1, 2008. As another example, the latest post created by any member of the tennis community 1 is dated Nov. 2, 2012 within the tennis community 1 and the latest post created by any member of the tennis community 2 is dated Oct. 1, 2008 within the tennis community 2. It should be noted that in some implementations, instead of Nov. 1, 2012, any other date may be used and instead of Oct. 1, 2008, any other date may be used. All other things being equal, the tennis community 1 is ranked as being more relevant than the tennis community 2. It should be noted that in some implementations, as shown in FIG. 3O, all other things being equal means that application of the rules 114, 116, 118, 120, 122, 124, 126, 128, 130, and 132 (FIG. 1), all of which include rules other than the freshness rules 134, results in the same rank of the tennis communities 1 and 2.

Figure 3P:
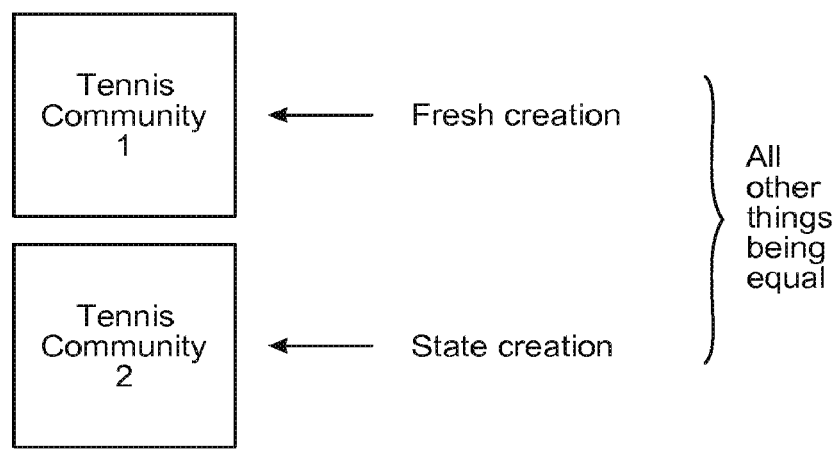
FIG. 3P is a diagram used to illustrate another application of the freshness rules, in accordance with some implementations of the present disclosure.

FIG. 3P is a diagram used to illustrate another application of the freshness rules 134 (FIG. 1), in accordance with various implementations described in the present disclosure. The tennis community 1 is created fresh and the tennis community 2 created has become stale. For example, the tennis community 1 is created on Nov. 15, 2012 and the tennis community 2 is created on Oct. 1, 2007. It should be noted that in some implementations, instead of Nov. 15, 2012, any other date may be used and instead of Oct. 1, 2007, any other date may be used. All other things being equal, the tennis community 1 is ranked as being more relevant than the tennis community 2. It should be noted that in some implementations, as shown in FIG. 3P, all other things being equal means that application of the rules 114, 116, 118, 120, 122, 124, 126, 128, 130, and 132 (FIG. 1), all of which include rules other than the freshness rules 134, results in the same rank of the tennis communities 1 and 2.

In several implementations, upon determining that the community 1 is created before the community 2, the community 2 may be ranked as being more relevant than the community 1 based on a topic of the communities 1 and 2. For example, upon determining that both communities 1 and 2 are associated with a topic 1, e.g., a book, a movie, etc., and upon determining that the community 1 is created before the community 2, the community 1 is ranked as being more relevant than the community 2. As another example, upon determining that both communities 1 and 2 are associated with a topic 2, e.g., an institution, a place, etc., and upon determining that the community 1 is created before the community 2, the community 2 is ranked as being more relevant than the community 1.

Figure 4A:
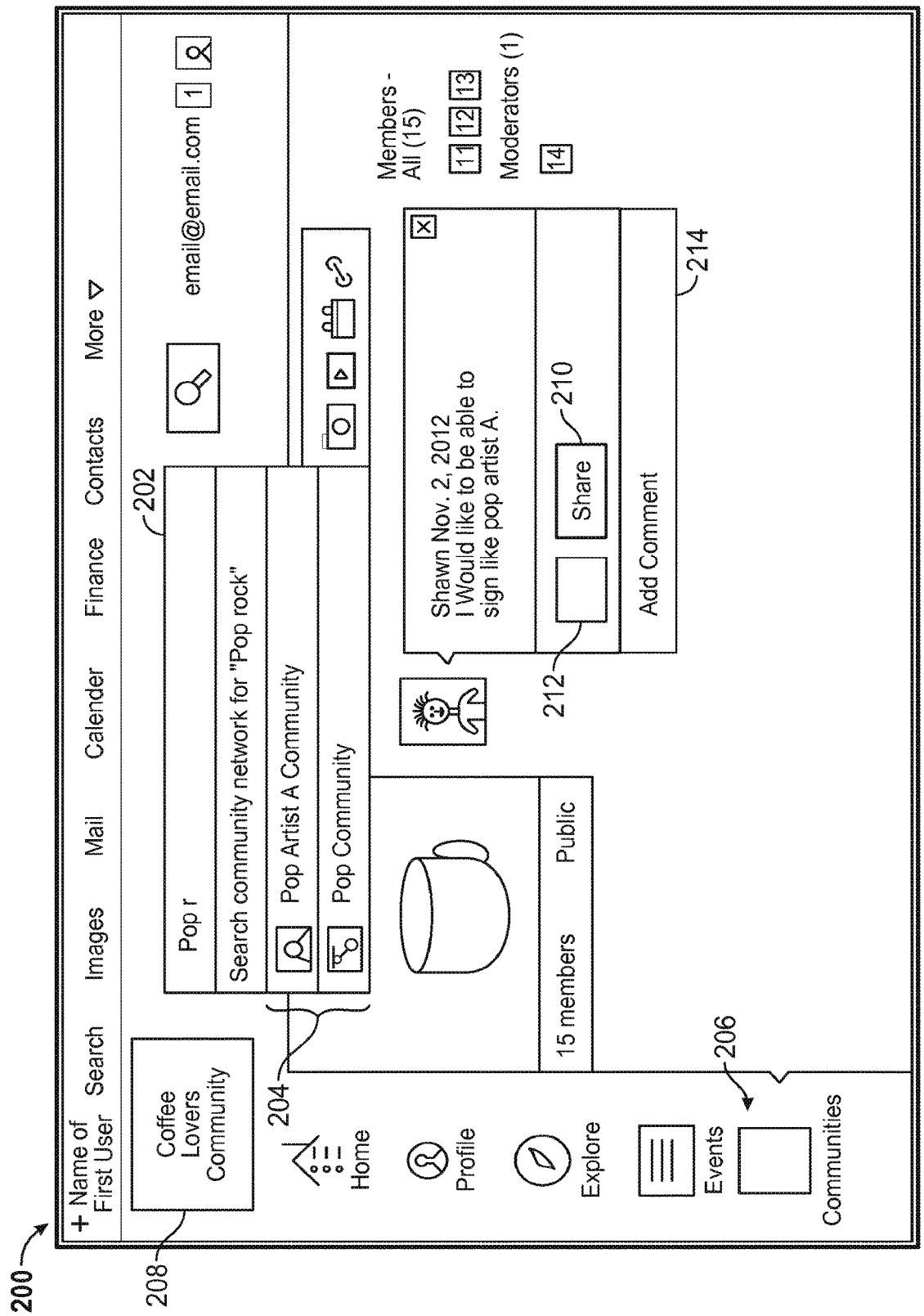
FIG. 4A is a diagram of a web page for illustrating ranking of communities according to an autocomplete feature, in accordance with various implementations of the present disclosure.

FIG. 4A is a diagram of a web page 200 for illustrating ranking of communities according to an autocomplete feature and application of one or more of the 112, 114, 116, 118, 120, 122, 124, 126, 128, 130, 132, and 134 (FIG. 1), in accordance with several implementations described in the present disclosure. The autocomplete feature is a portion of the search engine 220 (FIG. 1). The autocomplete feature is a feature of a computer program that predicts a word or phrase that a user wants to type in without typing the word or phrase completely. The word or phrase is predicted based on characters already typed in a search field. For example, when the user 102 types in search terms "pop r" in a search field 202 displayed on a display device of a client device, one or more processors of the one or more servers predicts that the user 102 intends to perform a search on a search term "pop rock".

The web page 200 is displayed on a display device of a client device by a graphical processing unit (GPU) of the client device. When the user 102 enters a search query, e.g., "pop r", within the search field 202, the autocomplete feature and one or more of the rules 112, 114, 116, 118, 120, 122, 124, 126, 128, 130, 132, and 134 are applied by one or more processors of the one or more servers to generate ranked search results 204, e.g., "Pop Artist A Community", "Pop community", etc. The search results 204 are displayed within a drop list.

The search results 204 are ranked to provide "Pop Artist A Community" as listed first compared to the "Pop community". In various implementations, instead of or in addition to listing communities in an order to show ranks of the communities, a prefix, e.g., letters A, B, C, D, roman numerals I, II, numbers 1, 2, 3, etc. are provided to indicate the ranks. For example, the search results 204 would include "A. Pop Artist A Community", "B. Pop community", etc. In some implementations, instead of or in addition to listing communities in an order to show ranks of the communities, community identifiers of the communities are displayed to distinguish between ranks of the communities. For example, an image representing the "Pop Artist A Community" is larger than an image representing the "Pop Community" when the "Pop Artist A Community" is ranked as being more relevant that the "Pop Community". As another example, an image representing the "Pop Artist A Community" is displayed with a different color, texture, shade, etc. than an image representing the "Pop Community" when the "Pop Artist A Community" is ranked as being more relevant that the "Pop Community". As yet another example, a different form of information representing the "Pop Artist A Community" than a form of information representing the "Pop Community" when the "Pop Artist A Community" is ranked as being more relevant that the "Pop Community". For example, a video of the "Pop Artist A Community" is displayed and an image of the "Pop Community" is displayed.

It should be noted that in several implementations, the auto complete feature is executed simultaneous with the application of one or more of the rules 112, 114, 116, 118, 120, 122, 124, 126, 128, 130, 132, and 134 (FIG. 1). For example, the rule 114 is executed simultaneous with the autocomplete feature to generate the search results 204. The "Pop Artist A Community" is endorsed by a pop star and the "Pop Community" is not endorsed by a pop star. In several implementations, a community is endorsed by a reputable or famous user when the user indicates to the community network 136 that the user is endorsing the community. The user indicates to the community network 136 that the user endorses the community via an input device of a client device. In these implementations, an owner or an administrator may check whether the user is authentic and is reputable or famous.

It should be noted that the search results 204 are displayed on the web page 200 that is accessed via a social network account of a first user, e.g., the user 102 (FIG. 1). The first user provides user identifying information, e.g., a user name, a password, a telephone number, an email address, etc., to access the web page 200. When the user identifying information is authenticated by one or more processors of the one or more servers, the first user is provided access to the web page 200. The web page 200 includes a communities image 206, which is selected by the first user after being authenticated to access one or more communities of which the first user is a member.

The first user is a member of a coffee lovers community, which is represented by a name "Coffee Lovers Community" 208 and is represented by a coffee cup image 210. In some implementations, a community is represented by any form of information, e.g., a video, an animation, an image, an audio, text, a combination thereof, etc.

The web page 200 includes a list of various services that are provided by one or more users that also provide a service of creating, managing, and deleting communities. For example, the web page 200 includes a search service used to search the World Wide Web, a service used to search images on the World Wide Web, an electronic messaging service, a calendar service, a finance service, a contacts service, and more services.

It should be noted that services are not limited to the ones described herein. For example, various other services include a legal search service, a shopping service, a document creation and storage service, a music service, and books services.

The web page 200 includes a "Home" symbol. When the "Home" symbol is selected by the first user via an input device of a client device, a home social network page of the first user is accessed by one or more processors of the one or more servers to display on a client device operated by the first user. For example, when the "Home" symbol is selected, the client device operated by the first user displays posts created by and/or received by the user within a social network account of the user, comments made and/or received by the user within the social network account, uploads made by the user to the social network account and/or sent by other users to the social network account, representations of social network friends of the user, etc.

The web page 200 further includes a "Profile" symbol. When the "Profile" symbol is selected by the first user via an input device of a client device, all posts created by the first user within a social network account of the first user are displayed. Moreover, in various implementations, information identifying the first user, e.g., an image of the first user, a name of the first user, an email address of the first user, etc., is displayed when the "Profile" symbol is selected by the first user.

It is indicated on the web page 200 that the first user is a member of the coffee lovers community. Moreover, the web page 200 indicates that there is a total of 15 members of the coffee lovers community and that the coffee lovers community is public. When the coffee lovers community is public, any user having a social network account within the social network 138 can become a member of the coffee lovers community.

The web page 200 includes posts, comments, uploads, etc. received from members of the coffee lovers community. For example, a post that is posted by Shawn on Nov. 2, 2012 indicates, "I would like to be able to sing like pop artist A". The first user may select a button 210 to share the post with one or more social network friends of the first user, may select a button 212 to indicate likeness towards the post, and/or add a comment within a comment field 214 to comment on the post. The web page 200 also includes images i1, i2, i3, etc. of some members of the coffee lovers community and an image i4 of a moderator, e.g., an administrator, an owner, etc., of the coffee lovers community.

It should be noted that in some implementations, the search results 204 can be generated on a web page that is accessed by selecting any symbol, e.g., the "Home" symbol, the "Profile" symbol, an "Explore" symbol, an "Events" symbol, etc. via an input device of a client device.

It should further be noted that in some implementations, more symbols than that shown on the web page 200 are included on the web page 200. For example, a symbol that allows a user to conduct a video chat with other users may be shown. As another example, a symbol that allows a user to play games with other users may be shown.

Figure 4B:
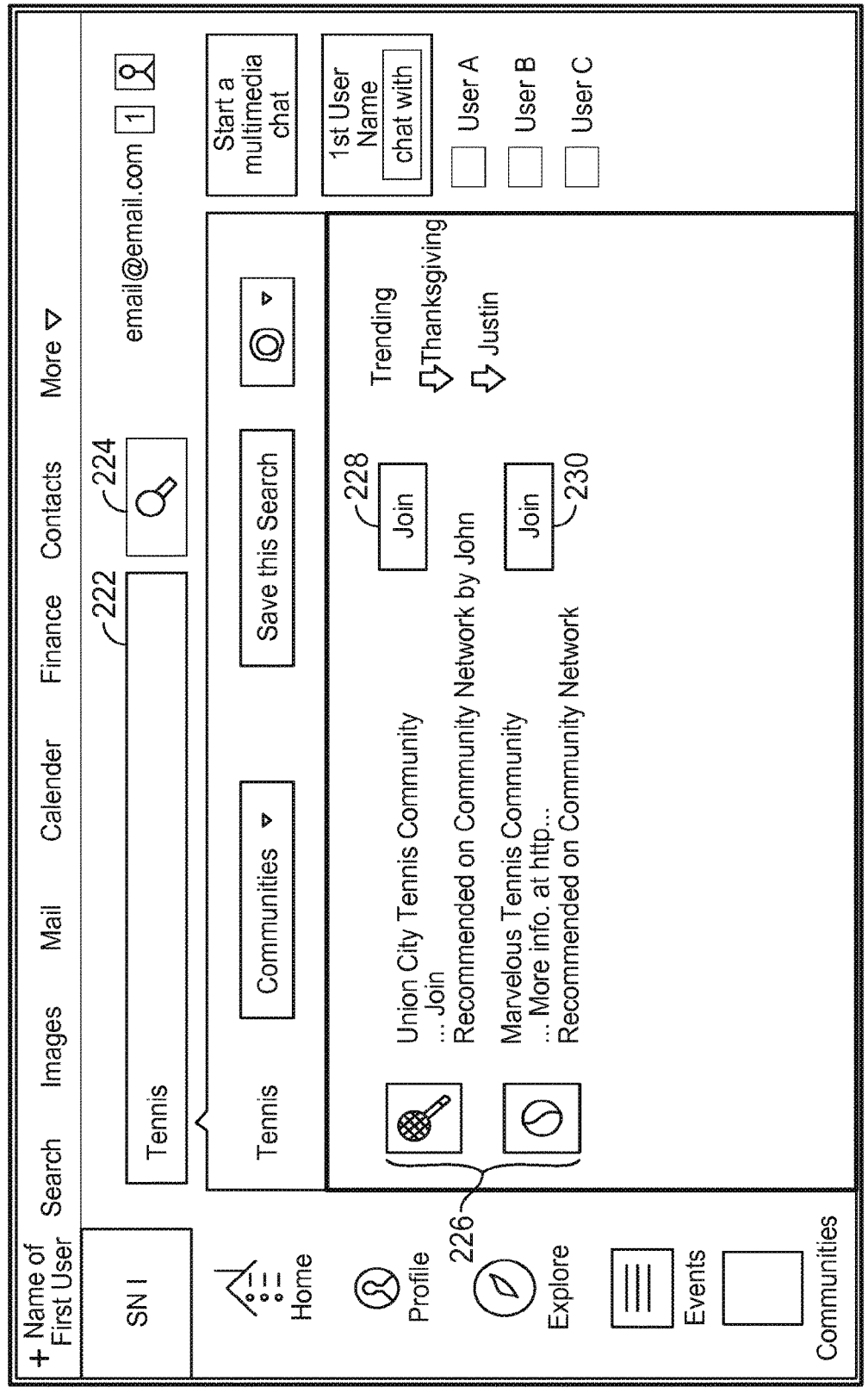
FIG. 4B is a diagram of a web page that illustrates ranking of communities within search results of a search query, in accordance with several implementations of the present disclosure.

FIG. 4B is a diagram of a web page 220 that illustrates ranking of communities within search results of a search query, in accordance with various implementations described in the present disclosure. The web page 220 is displayed on a display device of a client device by a GPU of the client device. The web page 220 includes a social network identifier (SNI) that identifies a social network that is accessed by the first user. Examples of the SNI include an image, a video, text, audio, multimedia, etc.

The first user enters a search query "Tennis" within a search field 222 and selects a search button 224. Upon receiving an indication of the selection of the search button 224, the search engine 110 (FIG. 1) is executed by one or more processors of the one or more servers to generate search results 226. The search results 226 are generated by applying one or more of the rules 112, 114, 116, 118, 120, 122, 124, 126, 128, 130, 132, and 134. For example, a "Union city Tennis Community" is ranked first and a "Marvelous Tennis Community" is ranked second in the search results. In this example, the "Union City Tennis Community" is recommended by John and there is no such recommendation for the "Marvelous Tennis Community". A tennis star may recommend a community by selecting a button within the community via an input device of a client device.

As explained above, ranking of communities within the search results 226 may be indicated in a variety of ways. For example, an image representing the "Union city Tennis Community" is larger than an image representing the "Marvelous Tennis Community".

In some implementations, a join button is displayed to join a community in the search results 226. For example, a user selects via an input device of a client device, a join button 228. Upon receiving an indication of the selection of the join button 228, one or more processors of the one or more servers facilitate a user to join "Union city Tennis Community". Similarly, a selection of a join button 230 allows a user to join the "Marvelous Tennis Community". It should be noted that a user can access the search field 222 upon selecting the "Home" symbol, the "Profile" symbol, the "Explore" symbol, the "Events" symbol, the "Communities" symbol, etc.

It should further be noted that in some implementations, more symbols than that shown on the web page 220 are included on the web page 220. For example, a symbol that allows a user to play games with other users may be shown.

Figure 5:
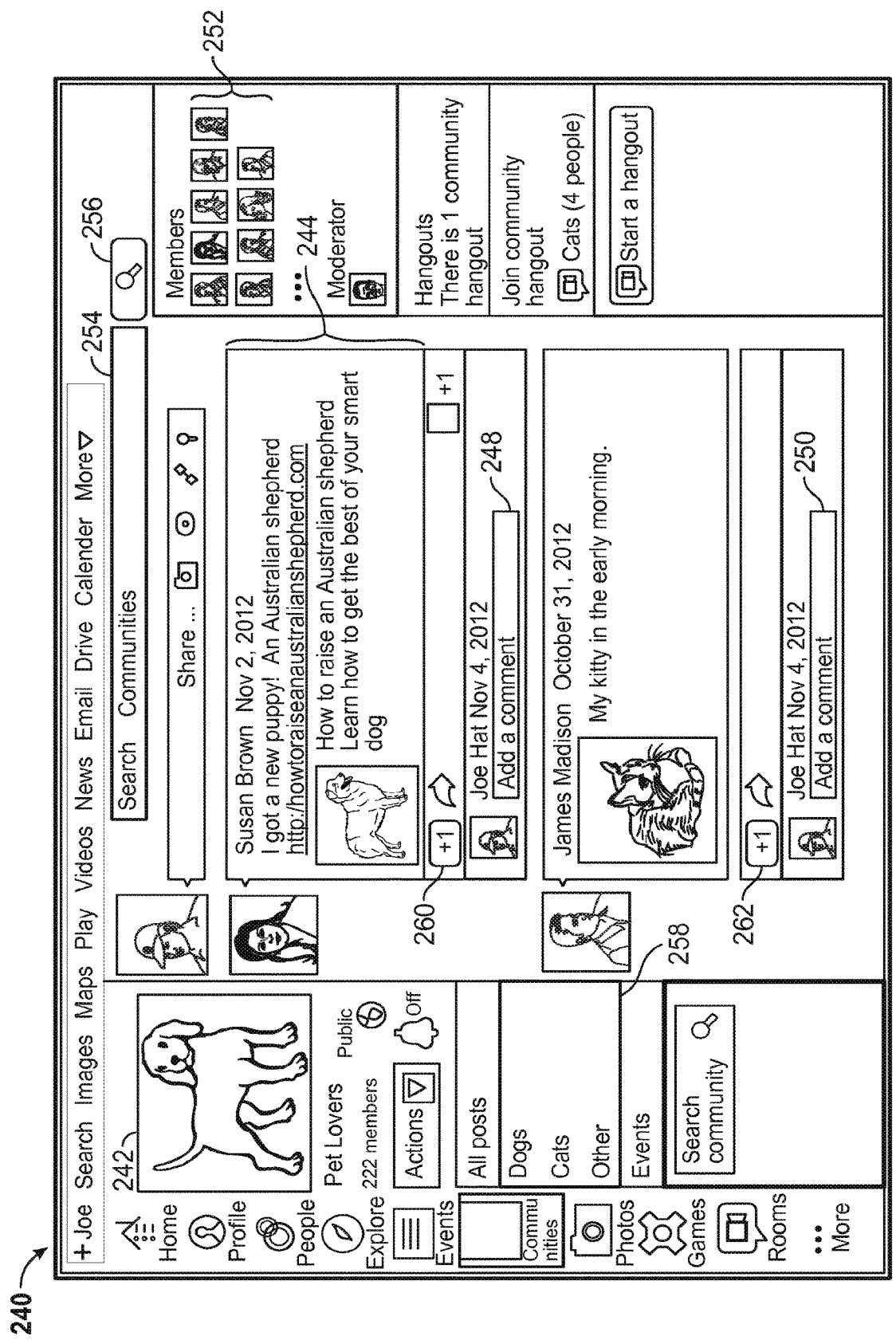
FIG. 5 is a diagram of a web page that illustrates a pet lover's community, in accordance with some implementations of the present disclosure.

FIG. 5 is a diagram of a web page 240 that illustrates a pet lovers community, in accordance with several implementations described in the present disclosure. A user named "Joe" is a member of the pet lovers community. An image 242 of the pet lovers community is displayed on the web page 240. Also, a total number "222" of members is indicated on the web page 240. It is further indicated on the web page 240 that the pet lovers community is a public community.

Posts 244 and 246 from members of the pet lovers community are displayed on the web page 240. The post 244 that includes text, a hyperlink, and an image of an Australian shepherd dog is posted by a member named "Susan Brown". The post 246 that includes an image of a cat and text is posted by a member named "James Madison". A user may use his/her/its input device of a client device to comment on the post 244 via a comment field 248 and the user may use the input device to comment on the post 246 via a comment field 250.

The web page 240 includes images of some members of the pet lovers community. Moreover, the web page 240 includes a search field 254 for receiving a search query to search the social network 138 and a search button 256 that is selected to generate search results. For example, when the search button 256 is selected, one or more of the rules 112, 114, 116, 118, 120, 122, 124, 126, 128, 130, 132, and 134 are applied by one or more processors of the one or more servers to rank communities within search results.

A filter box 258 allows a user to filter posts within the pet lovers community based on whether the user wishes to view posts related to dogs, cats, or other pets. A button 260 may be selected by a user via an input device of a client device to indicate likeness towards the post 244 to other members of the pet lovers community. Similarly, a button 262 may be selected by a user via an input device of a client device to indicate likeness towards the post 246 to members of the pet lovers community.

It should be noted that in several implementations, the web page 240 may include information regarding any other community, e.g. a community regarding a product, a community regarding a service, a community regarding an emotion, etc.

Figure 6:
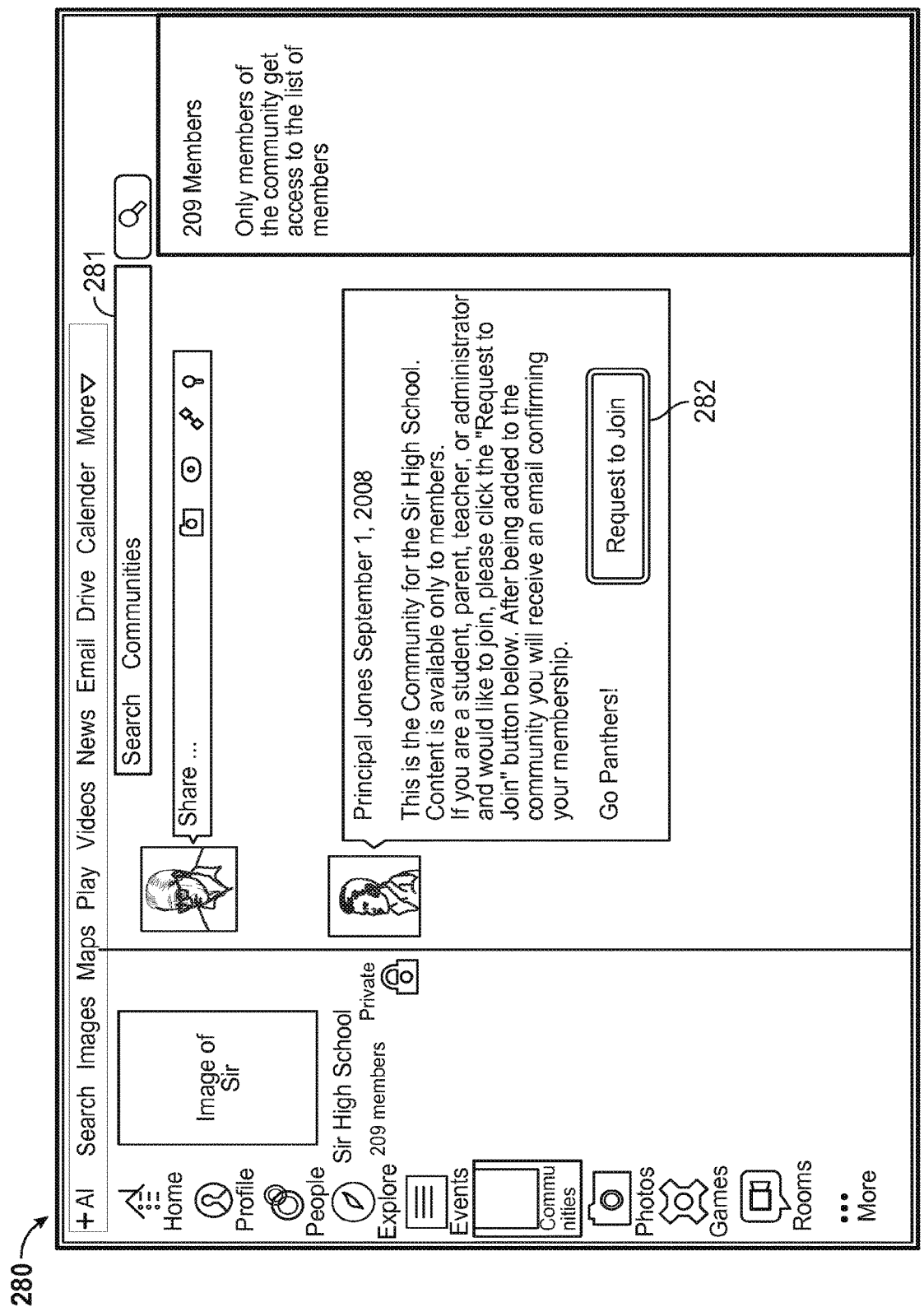
FIG. 6 is a diagram of a web page for joining a high school community, in accordance with various implementations described in the present disclosure.

FIG. 6 is a diagram of a web page 280 for joining a Sir high school community, in accordance with various implementations described in the present disclosure. As indicated, the Sir high community is a private community. When a community is private, a user can join the community after obtaining permission from an owner or administrator of the community. The user can post to the private community, comment on posts within the private community, can upload information to the private community after joining the private community. The Sir high school community may be a community ranked in search results generated in response to a search query. When a user selects a join button associated with the Sir high school community within the search results, one or more processors of the one or more servers provide data to display the web page 280 on a display device of a client device.

A user selects a request to join button 282. Upon receiving an indication of the selection of the request to join button 282, one or more processors of the one or more servers send the request to an administrator or owner of the Sir high school community. Once permission is received from the owner or administrator of the Sir high school community, one or more processors of the one or more servers allow a user that selected the request to join button 282 to join the Sir high school community.

When a search query is received within a search field 281, one or more processors of the one or more servers apply one or more of the rules 112, 114, 116, 118, 120, 122, 124, 126, 128, 130, 132, and 134 to rank communities within search results.

It should be noted that in several implementations, when a private community is ranked within search results, posts, comments, uploads, etc. from the community are controlled by one or more processors of the one or more servers to be hidden from view on a display device.

Figure 7:
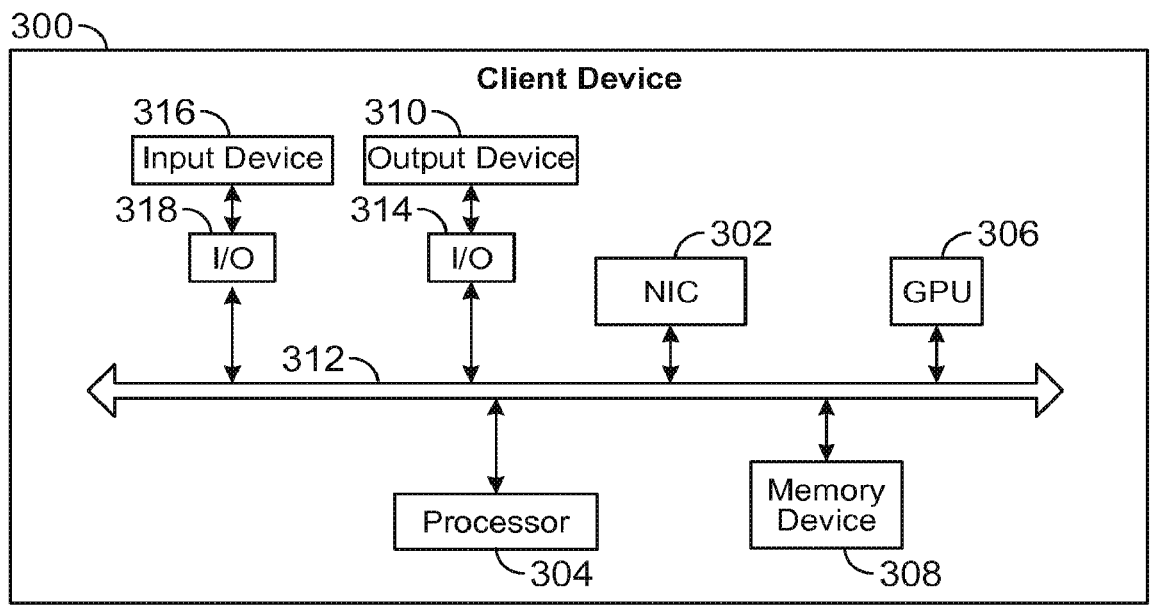
FIG. 7 is a block diagram of a client device of the system of FIG. 1, in accordance with several implementations of the present disclosure.

FIG. 7 is a block diagram of a client device 300, which is an example of the client device 104 and any other client devices referred to herein in the present disclosure, in accordance with several implementations of the present disclosure. The client device 300 includes a network interface controller (NIC) 302, a processor 304, a GPU 306, a memory device 308, an output device 310, and an input device 312. Examples of the NIC 302 include a network interface card and a network adapter. In several implementations, a controller includes one or more processors that are coupled to one or more memory devices. The NIC 302 communicates with the one or more servers via the network 108 (FIG. 1).

Examples of the output device 310 include a liquid crystal display (LCD) device, a light emitting diode (LED) display device, a cathode ray tube (CRT) display device, and a plasma display device. The output device 310 includes a display screen and is coupled with a bus 312 via an input/output interface (I/O) 314.

An input device 316 is coupled with the bus 312 via an I/O 318. Examples of the input device 316 include a mouse, a keyboard, a keypad, a stylus, a touchscreen, etc.

An I/O provides compatibility between the bus 312 and a device that are coupled with the I/O. For example, the I/O 314 converts a rate of transfer of data on bus 312 to a rate of transfer of data of output device 310. As another example, an I/O converts a protocol used by one device coupled with the I/O to a protocol that is used by the bus 312 that is coupled with the I/O.

In some implementations, the input device 316 is integrated within the output device 310. For example, in such implementations, the input device 316 is a touch screen.

It should be noted that in other implementations, the client device 300 includes any number of processors, memory devices, input devices, display devices, caches, NICs and GPUs. Moreover, in some implementations, all functions that are performed by the GPU 306 are performed by the processor 304.

Figure 8:
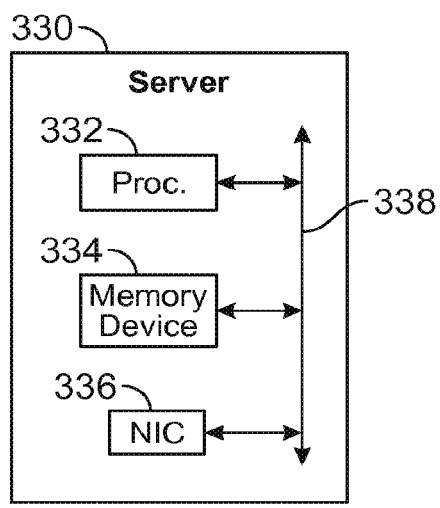
FIG. 8 is a block diagram of a server of the system of FIG. 1, in accordance with several implementations of the present disclosure.

FIG. 8 is a block diagram of a server 330, that is an example of any of the servers mentioned in the present disclosure, in accordance with various implementations described in the present disclosure. The server 330 includes a processor 332, a memory device 334, and a NIC 336, which are coupled with each other via a bus 338. The processor 332 communicates with one or more of the client devices, e.g., the client device 104 (FIG. 1), via the NIC 336 and the network 108 (FIG. 1). In some implementations, the processor 332 performs one or more operations described herein as being performed by one or more processors of the one or more servers.

It should be noted that in other implementations, the server 330 includes any number of processors, memory devices, NICs and GPUs.

It should be noted that although some implementations, described herein, relate to ranking communities in response to the search query 106 (FIG. 1), in several implementations, one or more of the rules 112, rules 114, rules 116, rules 118, rules 120, rules 122, rules 124, rules 126, rules 128, rules 130, rules 132, 134, the invitation rules are applied independent of whether the search query 106 is received by one or more processors of the one or more servers, and the ranking may be used to generate community lists.

Implementations described in the present disclosure may be fabricated as computer-readable code on a non-transitory computer-readable storage medium, which is a storage device or a memory device. The non-transitory computer-readable storage medium holds data which may be read by a computer system. Examples of the non-transitory computer-readable storage medium include network attached storage (NAS), a memory device, a ROM, a RAM, a combination of RAM and ROM, a Compact Disc (CD), a Blu-Ray™ disc, a flash memory, a hard disk, and a magnetic tape. The non-transitory computer-readable storage medium may be distributed over a network-coupled computer system so that the computer-readable code is stored and executed in a distributed fashion.

Although the method operations were described in a specific order in the flowchart of FIG. 2, it should be understood that some operations may be performed in a different order, when the order of the operations do not affect the expected results. In addition, other operations may be included in the methods presented, and the operations may be performed by different entities in a distributed fashion, as long as the processing of the operations is performed in a desired way.

In addition, at least one operation of some methods performs physical manipulation of physical quantities, and some of the operations described herein are useful machine operations. Implementations presented herein recite a device or apparatus. The apparatus is specially constructed for a purpose. The apparatus includes a processor capable of executing the program instructions of the computer programs presented herein.

Although the foregoing implementations have been described with a certain level of detail for purposes of clarity, it is noted that certain changes and modifications may be practiced within the scope of the appended claims. Accordingly, the provided implementations are to be considered illustrative and not restrictive, not limited by the details presented herein, and may be modified within the scope and equivalents of the appended claims.

What is claimed is:

1. A method comprising:
receiving, from a user device corresponding to a user of a social network, input of data entered into a search field;
predicting a search term based on the data entered into the search field;
determining, by a processing device, communities associated with the social network that satisfy a content match rule directed to a match between the predicted search term and information identifying the communities, the determined communities having scores that are based on results of the content match rule as applied to the information identifying the communities and the predicted search term, wherein each community comprises one or more posts received from one or more members of the community;

determining, by the processing device, levels of reputations of the members of the determined communities that satisfy the content match rule as applied to the information identifying the communities and the predicted search term;

modifying, by the processing device, the scores for the determined communities that satisfy the content match rule as applied to the information identifying the communities and the predicted search term, wherein the scores are modified based on the determined levels of the reputations of the members of the determined communities that satisfy the content match rule as applied to the information identifying the communities and the predicted search term and in view of a location of the user device, and wherein the location of the user device is determined based on global positioning system (GPS) data for the user device;

ranking, based on the modified scores, the determined communities that satisfy the content match rule as applied to the information identifying the communities and the predicted search term, wherein a higher score correlates to a higher ranking; and providing, in a user interface (UI) of the user device in response to the input of the data, identification of the predicted search term and the determined communities that satisfy the content match rule as applied to the information identifying the communities and the predicted search term, where the determined communities that satisfy the content match rule as applied to the information identifying the communities and the predicted search term are presented in the UI in a ranked order in accordance with the ranking.

2. The method of claim 1, wherein each community has one or more owners and one or more administrators.

3. The method of claim 1, wherein modifying the scores for the determined communities is performed further based on at least one of a number of posts in the determined communities that comprise a determined term identified as relevant to the determined communities or a number of comments and uploads within the determined communities that comprise the determined term.

4. The method of claim 1, wherein modifying the scores for the determined communities is performed further based on levels of interaction of the members with the communities.

5. The method of claim 4, further comprising determining the levels of interaction based on quantities of the interaction of the members with the communities, qualities of the interaction, or a combination thereof.

6. The method of claim 5, wherein the quantities of the interaction include a number of posts within the communities by the members, a number of shares of the posts by the members, a number of times the posts are indicated as liked by the members, or a combination thereof.

7. The method of claim 5, wherein the qualities of the interaction include whether the members are reading from the communities, adding comments to the communities, sharing posts of the communities, indicating likeness towards to the posts, or a combination thereof.

8. The method of claim 1, wherein modifying the scores for the determined communities is performed further based on one or more preference languages of the first user and languages used by the members within the communities.

9. The method of claim 1, wherein modifying the generated scores for the determined communities is performed further based on numbers of users that are the members of the communities and that are social network friends of the first user.

10. The method of claim 1, wherein modifying the generated scores for the determined communities is performed further based on whether the communities are associated with spam.

11. The method of claim 1, wherein modifying the scores for the determined communities is performed further based on rates at which the members join the communities.

12. The method of claim 1, wherein modifying the scores for the determined communities is performed further based on rates at which the members leave the communities.

13. The method of claim 1, modifying the scores for the determined communities is performed further based on rates at which the members join and leave the communities.

14. The method of claim 1, wherein modifying the scores for the determined communities is performed further based on ratios of numbers of posts made within the communities by the members and numbers of the members.

15. The method of claim 1, wherein modifying the scores for the determined communities is performed further based on a weighted combination of:
the levels of reputation of the members;
areas of expertise of the members;
levels of association of the members with the communities;
match between a location of the first user and locations of the communities;
match between one or more preference languages of the first user and languages used by the members within the communities;
numbers of users that are the members of the communities and that are social network friends of the first user;
associations of the communities with spam;
rates at which the members join the communities during a time period;
rates at which the members leave the communities during a time period;
rates at which the members that join and leave the communities within a time period; and
ratios of numbers of posts made within the communities by the members and numbers of the members.

16. The method of claim 1, wherein modifying the scores for the determined communities is performed further based on dates of latest interactions of the members with the communities.

17. The method of claim 16, wherein the interactions comprise posting to the communities, sharing posts within the communities, indicating likeness towards posts within the communities, commenting on posts within the communities, or a combination thereof.

18. The method of claim 1, wherein modifying the scores for the determined communities is performed further based on dates of creations of the communities.

19. The method of claim 1, wherein the ranked order places a higher rank to communities with members having higher levels of reputations.

20. A server system comprising:
a processing device to:
receive, from a user device corresponding to a user of a social network, input of data entered into a search field;
predict a search term based on the data entered into the search field;

determine communities associated with the social network that satisfy a content match rule directed to a match between the predicted search term and information identifying the communities, the determined communities having scores that are based on results of the content match rule as applied to the information identifying the communities and the predicted search term, wherein each community comprises one or more posts received from one or more members of the community;

determine levels of reputations of the members of the determined communities that satisfy the content match rule as applied to the information identifying the communities and the predicted search term;

modify the scores for the determined communities that satisfy the content match rule as applied to the information identifying the communities and the predicted search term, wherein the scores are modified based on the determined levels of the reputations of the members of the determined communities that satisfy the content match rule as applied to the information identifying the communities and the predicted search term and in view of a location of the user device, and wherein the location of the user device is determined based on global positioning system (GPS) data for the user device;

rank, based on the modified scores, the determined communities that satisfy the content match rule as applied to the information identifying the communities and the predicted search term, wherein a higher score correlates to a higher ranking; and provide, in a user interface (UI) of the user device in response to the input of the data, identification of the predicted search term and the determined communities that satisfy the content match rule as applied to the information identifying the communities and the predicted search term UI, where the determined communities that satisfy the content match rule as applied to the information identifying the communities and the predicted search term are presented in the UI in a ranked order in accordance with the ranking; and a memory device communicably coupled to the processing device, the memory device to store user accounts associated with the user and the members.

21. The server system of claim 20, wherein each community has one or more owners and one or more administrators.

22. A non-transitory computer-readable medium encoding instructions, the instructions in response to execution by a processing device, cause the processing device to perform operations comprising:

receiving, from a user device corresponding to a user of a social network, input of data entered into a search field;

predicting a search term based on the data entered into the search field;

determining, by the processing device, communities associated with the social network that satisfy a content match rule directed to a match between the predicted search term and information identifying the communities, the determined communities having scores that are based on results of the content match rule as applied to the information identifying the communities and the predicted search term, wherein each community comprises one or more posts received from one or more members of the community;

determining, by the processing device, levels of reputations of the members of the determined communities that satisfy the content match rule as applied to the information identifying the communities and the predicted search term;

modifying, by the processing device, the scores for the determined communities that satisfy the content match rule as applied to the information identifying the communities and the predicted search term, wherein the scores are modified based on the determined levels of the reputations of the members of the determined communities that satisfy the content match rule as applied to the information identifying the communities and the predicted search term and in view of a location of the user device, and wherein the location of the user device is determined based on global positioning system (GPS) data for the user device;

ranking based on the modified scores, the determined communities that satisfy the content match rule as applied to the information identifying the communities and the predicted search term, wherein a higher score correlates to a higher ranking; and providing, in a user interface (UI) of the user device in response to the input of the data, identification of the predicted search term and the determined communities that satisfy the content match rule as applied to the information identifying the communities and the predicted search term where the determined communities that satisfy the content match rule as applied to the information identifying communities and the predicted search term are presented in the UI in a ranked order in accordance with the ranking.

23. The non-transitory computer-readable medium of claim 22, wherein each community has one or more owners and one or more administrators.

* * * * *